US012777364B2

(12) United States Patent
Yao

(10) Patent No.: US 12,777,364 B2
(45) Date of Patent: Oct. 27, 2026

(54) PER QOS FLOW PER UE MEASUREMENTS ON ONE WAY DELAY BETWEEN PSF UPF AND UE

(71) Applicant: Intel Products IP LLC, Santa Clara, CA (US)

(72) Inventor: Yizhi Yao, Chandler, AZ (US)

(73) Assignee: Intel Products IP LLC, Santa Clara, CA (US)

( * ) Notice: Subject to any disclaimer, the term of this patent is extended or adjusted under 35 U.S.C. 154(b) by 0 days.

(21) Appl. No.: 18/928,696

(22) Filed: Oct. 28, 2024

(65) Prior Publication Data

US 2025/0056308 A1 Feb. 13, 2025

Related U.S. Application Data

(60) Provisional application No. 63/594,756, filed on Oct. 31, 2023.

(51) Int. Cl.
*H04W 28/02* (2009.01)
*H04L 43/08* (2022.01)

(52) U.S. Cl.
CPC ......... *H04W 28/0268* (2013.01); *H04L 43/08* (2013.01)

(58) Field of Classification Search
CPC ........................... H04W 28/0268; H04L 43/08
See application file for complete search history.

(56) References Cited

U.S. PATENT DOCUMENTS

| | | | | |
|---|---|---|---|---|
| 9,210,453 | B1 * | 12/2015 | Cloonan | H04N 21/2385 |
| 12,082,038 | B2 * | 9/2024 | Yao | H04L 43/026 |
| 12,530,265 | B1 * | 1/2026 | Donovan | G06F 11/1464 |
| 2020/0293397 | A1 * | 9/2020 | Zhu | G06F 11/1048 |
| 2020/0359244 | A1 * | 11/2020 | Yao | H04W 24/10 |
| 2021/0289393 | A1 * | 9/2021 | Yao | H04L 43/026 |
| 2021/0345160 | A1 * | 11/2021 | Yao | H04W 28/24 |
| 2024/0007880 | A1 * | 1/2024 | Cakulev | H04W 24/08 |
| 2024/0334232 | A1 * | 10/2024 | Talebi Fard | H04W 24/10 |
| 2025/0350909 | A1 * | 11/2025 | Zhu | H04L 41/0806 |

* cited by examiner

*Primary Examiner* — Dhairya A Patel
(74) *Attorney, Agent, or Firm* — Schwegman Lundberg & Woessner, P.A.

(57) ABSTRACT

An apparatus and method for measuring per Quality of Service (QOS) flow per user equipment (UE) for one-way delay between a Packet Data Unit (PDU) Session Anchor User Plane Function (PSA UPF) and a UE in 5G networks. The integrated downlink (DL) and uplink (UL) UE level delay measurements are generated and provided. The UE level delay measurements include average DL/UL packet delays, both excluding and including D1 UL Packet Data Convergence Protocol (PDCP) delay, calculated using time-stamps from General Packet Radio System (GPRS) Tunnelling Protocol (GTP) packet data unit (PDU) monitoring response packets.

19 Claims, 10 Drawing Sheets

PER QOS FLOW PER UE MEASUREMENTS ON ONE WAY DELAY BETWEEN PSF UPF AND UE

PRIORITY CLAIM

This application claims the benefit of priority to U.S. Provisional Patent Application Ser. No. 63/594,756, filed Oct. 31, 2023, which is incorporated herein by reference in its entirety.

BACKGROUND

Mobile communication has evolved significantly from early voice systems to highly sophisticated integrated communication platform. Next-generation (NG) wireless communication systems, including 5th generation (5G) and sixth generation (6G) or new radio (NR) systems, are to provide access to information and sharing of data by various users (e.g., user equipment (UEs)) and applications. NR is to be a unified network/system that is to meet vastly different and sometimes conflicting performance dimensions and services driven by different services and applications. As such, the complexity of such communication systems, as well as interactions between elements within a communication system, has increased. For example, the ability to collect and analyze measurements is used to optimize network performance and enable advanced functionalities such as artificial intelligence (AI) and machine learning (ML) continues to evolve.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various embodiments discussed in the present document.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1A:
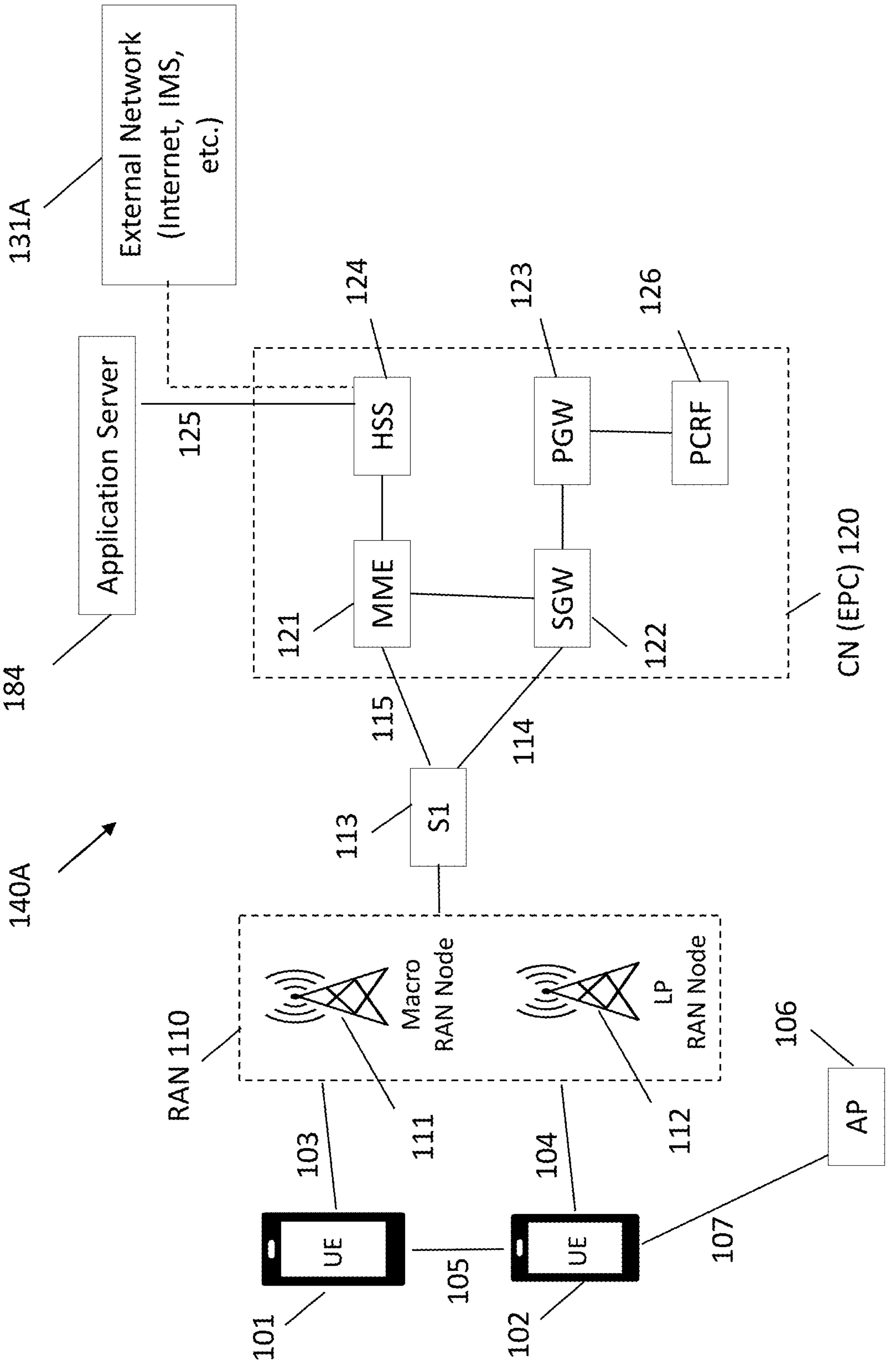
FIG. 1A illustrates an architecture of a network, in accordance with some aspects.

FIG. 1A illustrates an architecture of a network in accordance with some aspects. The network 140A includes 3GPP LTE/4G and NG network functions that may be extended to 6G functions. Accordingly, although 5G will be referred to, it is to be understood that this is to extend as able to 6G structures, systems, and functions. A network function may be implemented as a discrete network element on a dedicated hardware, as a software instance running on dedicated hardware, and/or as a virtualized function instantiated on an appropriate platform, e.g., dedicated hardware or a cloud infrastructure.

The network 140A is shown to include user equipment (UE) 101 and UE 102. The UEs 101 and 102 are illustrated as smartphones (e.g., handheld touchscreen mobile computing devices connectable to one or more cellular networks) but may also include any mobile or non-mobile computing device, such as portable (laptop) or desktop computers, wireless handsets, drones, or any other computing device including a wired and/or wireless communications interface. The UEs 101 and 102 may be collectively referred to herein as UE 101, and UE 101 may be used to perform one or more of the techniques disclosed herein.

Any of the radio links described herein (e.g., as used in the network 140A or any other illustrated network) may operate according to any exemplary radio communication technology and/or standard. Any spectrum management scheme including, for example, dedicated licensed spectrum, unlicensed spectrum, (licensed) shared spectrum (such as Licensed Shared Access (LSA) in 2.3-2.4 GHz, 3.4-3.6 GHz, 3.6-3.8 GHz, and other frequencies and Spectrum Access System (SAS) in 3.55-3.7 GHz and other frequencies). Different Single Carrier or Orthogonal Frequency Domain Multiplexing (OFDM) modes (CP-OFDM, SC-FDMA, SC-OFDM, filter bank-based multicarrier (FBMC), OFDMA, etc.), and in particular 3GPP NR, may be used by allocating the OFDM carrier data bit vectors to the corresponding symbol resources.

In some aspects, any of the UEs 101 and 102 can comprise an Internet-of-Things (IoT) UE or a Cellular IoT (CIoT) UE, which can comprise a network access layer designed for low-power IoT applications utilizing short-lived UE connections. In some aspects, any of the UEs 101 and 102 can include a narrowband (NB) IoT UE (e.g., such as an enhanced NB-IoT (eNB-IoT) UE and Further Enhanced (FeNB-IoT) UE). An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network includes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network. In some aspects, any of the UEs 101 and 102 can include enhanced MTC (eMTC) UEs or further enhanced MTC (FeMTC) UEs.

The UEs 101 and 102 may be configured to connect, e.g., communicatively couple, with a radio access network (RAN) 110. The RAN 110 may be, for example, an Evolved Universal Mobile Telecommunications System (UMTS) Terrestrial Radio Access Network (E-UTRAN), a NextGen RAN (NG RAN), or some other type of RAN.

The UEs 101 and 102 utilize connections 103 and 104, respectively, each of which comprises a physical communications interface or layer (discussed in further detail below); in this example, the connections 103 and 104 are illustrated as an air interface to enable communicative coupling, and may be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a 5G protocol, a 6G protocol, and the like.

In an aspect, the UEs 101 and 102 may further directly exchange communication data via a ProSe interface 105. The ProSe interface 105 may alternatively be referred to as a sidelink (SL) interface comprising one or more logical channels, including but not limited to a Physical Sidelink Control Channel (PSCCH), a Physical Sidelink Shared Channel (PSSCH), a Physical Sidelink Discovery Channel (PSDCH), a Physical Sidelink Broadcast Channel (PSBCH), and a Physical Sidelink Feedback Channel (PSFCH).

The UE 102 is shown to be configured to access an access point (AP) 106 via connection 107. The connection 107 can comprise a local wireless connection, such as, for example, a connection consistent with any IEEE 802.11 protocol, according to which the AP 106 can comprise a wireless fidelity (WiFi®) router. In this example, the AP 106 is shown to be connected to the Internet without connecting to the core network of the wireless system (described in further detail below).

The RAN 110 can include one or more access nodes that enable the connections 103 and 104. These access nodes (ANs) may be referred to as base stations (BSs), NodeBs, evolved NodeBs (eNBs), Next Generation NodeBs (gNBs), RAN nodes, and the like, and can comprise ground stations (e.g., terrestrial access points) or satellite stations providing coverage within a geographic area (e.g., a cell). In some aspects, the communication nodes 111 and 112 may be transmission/reception points (TRPs). In instances when the communication nodes 111 and 112 are NodeBs (e.g., eNBs or gNBs), one or more TRPs can function within the communication cell of the NodeBs. The RAN 110 may include one or more RAN nodes for providing macrocells, e.g., macro RAN node 111, and one or more RAN nodes for providing femtocells or picocells (e.g., cells having smaller coverage areas, smaller user capacity, or higher bandwidth compared to macrocells), e.g., low power (LP) RAN node 112.

Any of the RAN nodes 111 and 112 can terminate the air interface protocol and may be the first point of contact for the UEs 101 and 102. In some aspects, any of the RAN nodes 111 and 112 can fulfill various logical functions for the RAN 110 including, but not limited to, radio network controller (RNC) functions such as radio bearer management, uplink and downlink dynamic radio resource management and data packet scheduling, and mobility management. In an example, any of the nodes 111 and/or 112 may be a gNB, an eNB, or another type of RAN node.

The RAN 110 is shown to be communicatively coupled to a core network (CN) 120 via an S1 interface 113. In aspects, the CN 120 may be an evolved packet core (EPC) network, a NextGen Packet Core (NPC) network, or some other type of CN (e.g., as illustrated in reference to FIGS. 1B-1C). In this aspect, the S1 interface 113 is split into two parts: the S1-U interface 114, which carries traffic data between the RAN nodes 111 and 112 and the serving gateway (S-GW) 122, and the S1-mobility management entity (MME) interface 115, which is a signaling interface between the RAN nodes 111 and 112 and MMEs 121.

In this aspect, the CN 120 comprises the MMEs 121, the S-GW 122, the Packet Data Network (PDN) Gateway (P-GW) 123, and a home subscriber server (HSS) 124. The MMEs 121 may be similar in function to the control plane of legacy Serving General Packet Radio Service (GPRS) Support Nodes (SGSN). The MMEs 121 may manage mobility aspects in access such as gateway selection and tracking area list management. The HSS 124 may comprise a database for network users, including subscription-related information to support the network entities' handling of communication sessions. The CN 120 may comprise one or several HSSs 124, depending on the number of mobile subscribers, on the capacity of the equipment, on the organization of the network, etc. For example, the HSS 124 can provide support for routing/roaming, authentication, authorization, naming/addressing resolution, location dependencies, etc.

The S-GW 122 may terminate the S1 interface 113 towards the RAN 110, and routes data packets between the RAN 110 and the CN 120. In addition, the S-GW 122 may be a local mobility anchor point for inter-RAN node handovers and also may provide an anchor for inter-3GPP mobility. Other responsibilities of the S-GW 122 may include a lawful intercept, charging, and some policy enforcement.

The P-GW 123 may terminate an SGi interface toward a PDN. The P-GW 123 may route data packets between the CN 120 and external networks such as a network including the application server 184 (alternatively referred to as application function (AF)) via an Internet Protocol (IP) interface 125. The P-GW 123 can also communicate data to other external networks 131A, which can include the Internet, IP multimedia subsystem (IPS) network, and other networks. Generally, the application server 184 may be an element offering applications that use IP bearer resources with the core network (e.g., UMTS Packet Services (PS) domain, LTE PS data services, etc.). In this aspect, the P-GW 123 is shown to be communicatively coupled to an application server 184 via an IP interface 125. The application server 184 can also be configured to support one or more communication services (e.g., Voice-over-Internet Protocol (VOIP) sessions, PTT sessions, group communication sessions, social networking services, etc.) for the UEs 101 and 102 via the CN 120.

The P-GW 123 may further be a node for policy enforcement and charging data collection. Policy and Charging Rules Function (PCRF) 126 is the policy and charging control element of the CN 120. In a non-roaming scenario, in some aspects, there may be a single PCRF in the Home Public Land Mobile Network (HPLMN) associated with a UE's Internet Protocol Connectivity Access Network (IP-CAN) session. In a roaming scenario with a local breakout of traffic, there may be two PCRFs associated with a UE's IP-CAN session: a Home PCRF (H-PCRF) within an HPLMN and a Visited PCRF (V-PCRF) within a Visited Public Land Mobile Network (VPLMN). The PCRF 126 may be communicatively coupled to the application server 184 via the P-GW 123.

In some aspects, the communication network 140A may be an IoT network or a 5G or 6G network, including 5G new radio network using communications in the licensed (5G NR) and the unlicensed (5G NR-U) spectrum. One of the current enablers of IoT is the narrowband-IoT (NB-IoT). Operation in the unlicensed spectrum may include dual connectivity (DC) operation and the standalone LTE system in the unlicensed spectrum, according to which LTE-based technology solely operates in unlicensed spectrum without the use of an "anchor" in the licensed spectrum, called MulteFire. Further enhanced operation of LTE systems in the licensed as well as unlicensed spectrum is expected in future releases and 5G systems. Such enhanced operations can include techniques for sidelink resource allocation and UE processing behaviors for NR sidelink V2X communications.

An NG system architecture (or 6G system architecture) can include the RAN 110 and a 5G core network (5GC) 120. The NG-RAN 110 can include a plurality of nodes, such as gNBs and NG-eNBs. The CN 120 (e.g., a 5G core network/5GC) can include an access and mobility function (AMF) and/or a user plane function (UPF). The AMF and the UPF may be communicatively coupled to the gNBs and the NG-eNBs via NG interfaces. More specifically, in some aspects, the gNBs and the NG-eNBs may be connected to the AMF by NG-C interfaces, and to the UPF by NG-U interfaces. The gNBs and the NG-eNBs may be coupled to each other via Xn interfaces.

In some aspects, the NG system architecture can use reference points between various nodes. In some aspects, each of the gNBs and the NG-eNBs may be implemented as a base station, a mobile edge server, a small cell, a home eNB, and so forth. In some aspects, a gNB may be a primary node (MN) and NG-eNB may be a secondary node (SN) in a 5G architecture.

Figure 1B:
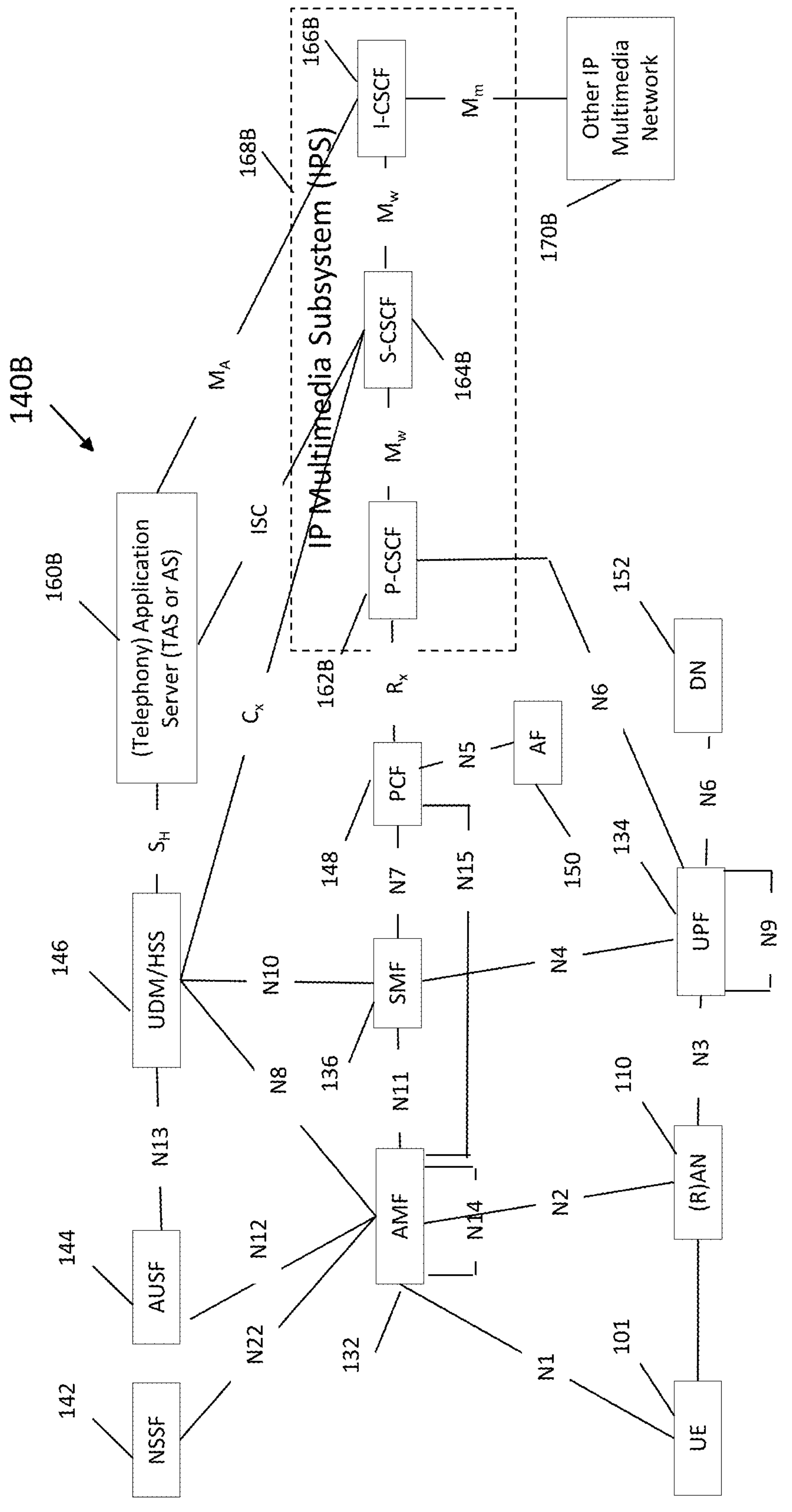
FIG. 1B illustrates a non-roaming 5G system architecture in accordance with some aspects.

FIG. 1B illustrates a non-roaming 5G system architecture in accordance with some aspects. In particular, FIG. 1B illustrates a 5G system architecture 140B in a reference point representation, which may be extended to a 6G system architecture. More specifically, UE 102 may be in communication with RAN 110 as well as one or more other 5GC network entities. The 5G system architecture 140B includes a plurality of network functions (NFs), such as an AMF 132, session management function (SMF) 136, policy control function (PCF) 148, application function (AF) 150, UPF 134, network slice selection function (NSSF) 142, authentication server function (AUSF) 144, and unified data management (UDM)/home subscriber server (HSS) 146.

The UPF 134 can provide a connection to a data network (DN) 152, which can include, for example, operator services, Internet access, or third-party services. The AMF 132 may be used to manage access control and mobility and can also include network slice selection functionality. The AMF 132 may provide UE-based authentication, authorization, mobility management, etc., and may be independent of the access technologies. The SMF 136 may be configured to set up and manage various sessions according to network policy. The SMF 136 may thus be responsible for session management and allocation of IP addresses to UEs. The SMF 136 may also select and control the UPF 134 for data transfer. The SMF 136 may be associated with a single session of a UE 101 or multiple sessions of the UE 101. This is to say that the UE 101 may have multiple 5G sessions. Different SMFs may be allocated to each session. The use of different SMFs may permit each session to be individually managed. As a consequence, the functionalities of each session may be independent of each other.

The UPF 134 may be deployed in one or more configurations according to the desired service type and may be connected with a data network. The PCF 148 may be configured to provide a policy framework using network slicing, mobility management, and roaming (similar to PCRF in a 4G communication system). The UDM may be configured to store subscriber profiles and data (similar to an HSS in a 4G communication system).

The AF 150 may provide information on the packet flow to the PCF 148 responsible for policy control to support a desired QoS. The PCF 148 may set mobility and session management policies for the UE 101. To this end, the PCF 148 may use the packet flow information to determine the appropriate policies for proper operation of the AMF 132 and SMF 136. The AUSF 144 may store data for UE authentication.

In some aspects, the 5G system architecture 140B includes an IP multimedia subsystem (IMS) 168B as well as a plurality of IP multimedia core network subsystem entities, such as call session control functions (CSCFs). More specifically, the IMS 168B includes a CSCF, which can act as a proxy CSCF (P-CSCF) 162B, a serving CSCF (S-CSCF) 164B, an emergency CSCF (E-CSCF) (not illustrated in FIG. 1B), or interrogating CSCF (I-CSCF) 166B. The P-CSCF 162B may be configured to be the first contact point for the UE 102 within the IM subsystem (IMS) 168B. The S-CSCF 164B may be configured to handle the session states in the network, and the E-CSCF may be configured to handle certain aspects of emergency sessions such as routing an emergency request to the correct emergency center or PSAP. The I-CSCF 166B may be configured to function as the contact point within an operator's network for all IMS connections destined to a subscriber of that network operator, or a roaming subscriber currently located within that network operator's service area. In some aspects, the I-CSCF 166B may be connected to another IP multimedia network 170B, e.g., an IMS operated by a different network operator.

In some aspects, the UDM/HSS 146 may be coupled to an application server 184, which can include a telephony application server (TAS) or another application server (AS) 160B. The AS 160B may be coupled to the IMS 168B via the S-CSCF 164B or the I-CSCF 166B.

A reference point representation shows that interaction can exist between corresponding NF services. For example, FIG. 1B illustrates the following reference points: N1 (between the UE 102 and the AMF 132), N2 (between the RAN 110 and the AMF 132), N3 (between the RAN 110 and the UPF 134), N4 (between the SMF 136 and the UPF 134), N5 (between the PCF 148 and the AF 150, not shown), N6 (between the UPF 134 and the DN 152), N7 (between the SMF 136 and the PCF 148, not shown), N8 (between the UDM 146 and the AMF 132, not shown), N9 (between two UPFs 134, not shown), N10 (between the UDM 146 and the SMF 136, not shown), N11 (between the AMF 132 and the SMF 136, not shown), N12 (between the AUSF 144 and the AMF 132, not shown), N13 (between the AUSF 144 and the UDM 146, not shown), N14 (between two AMFs 132, not shown), N15 (between the PCF 148 and the AMF 132 in case of a non-roaming scenario, or between the PCF 148 and a visited network and AMF 132 in case of a roaming scenario, not shown), N16 (between two SMFs, not shown), and N22 (between AMF 132 and NSSF 142, not shown). Other reference point representations not shown in FIG. 1B can also be used.

Figure 1C:
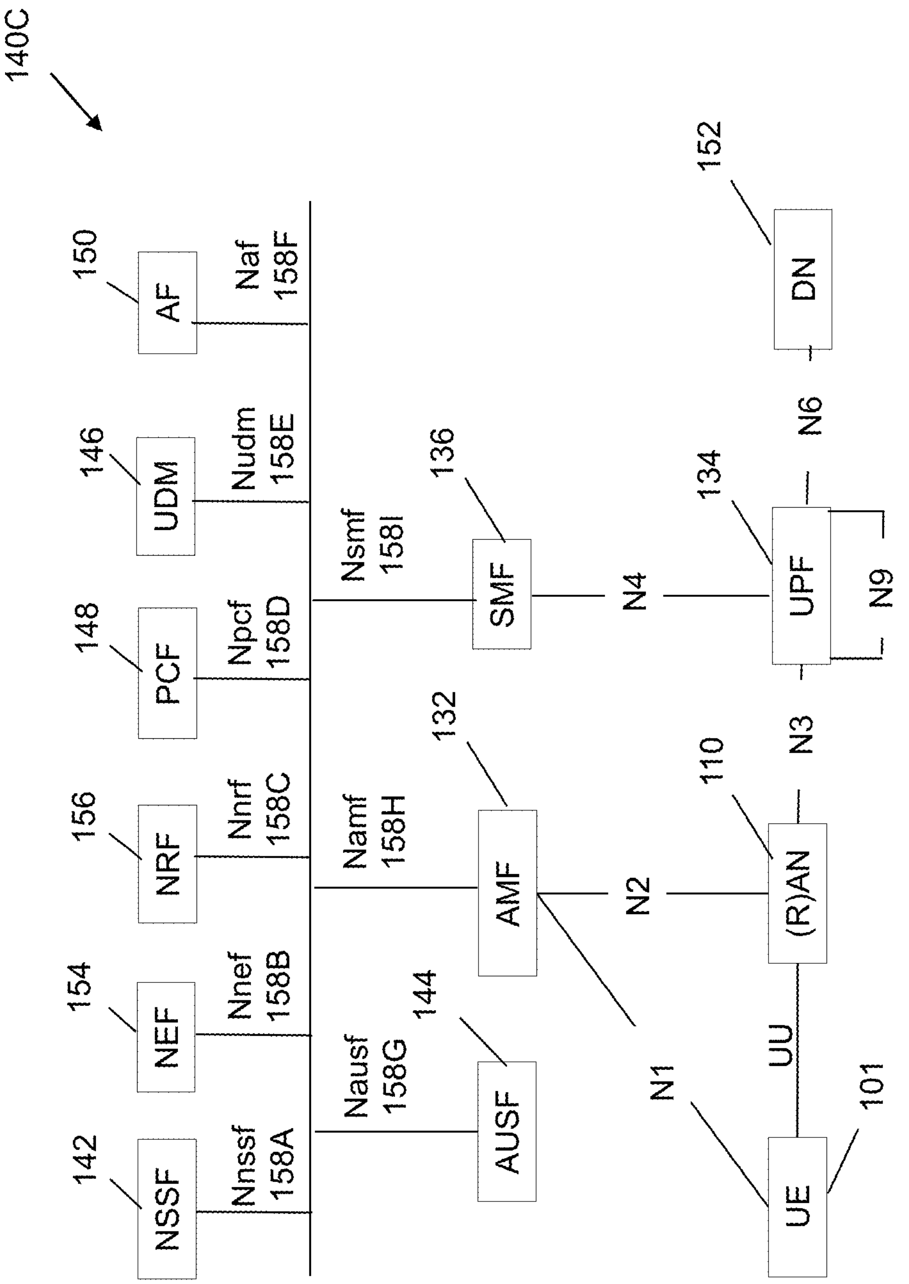
FIG. 1C illustrates a non-roaming 5G system architecture in accordance with some aspects.

FIG. 1C illustrates a 5G system architecture 140C and a service-based representation. In addition to the network entities illustrated in FIG. 1B, system architecture 140C can also include a network exposure function (NEF) 154 and a network repository function (NRF) 156. In some aspects, 5G system architectures may be service-based and interaction between network functions may be represented by corresponding point-to-point reference points Ni or as service-based interfaces.

In some aspects, as illustrated in FIG. 1C, service-based representations may be used to represent network functions within the control plane that enable other authorized network functions to access their services. In this regard, 5G system architecture 140C can include the following service-based interfaces: Namf 158H (a service-based interface exhibited by the AMF 132), Nsmf 158I (a service-based interface exhibited by the SMF 136), Nnef 158B (a service-based interface exhibited by the NEF 154), Npcf 158D (a service-based interface exhibited by the PCF 148), a Nudm 158E (a service-based interface exhibited by the UDM 146), Naf 158F (a service-based interface exhibited by the AF 150), Nnrf 158C (a service-based interface exhibited by the NRF 156), Nnssf 158A (a service-based interface exhibited by the NSSF 142), Nausf 158G (a service-based interface exhibited by the AUSF 144). Other service-based interfaces (e.g., Nudr, N5g-eir, and Nudsf) not shown in FIG. 1C can also be used.

NR-V2X architectures may support high-reliability low latency sidelink communications with a variety of traffic patterns, including periodic and aperiodic communications with random packet arrival time and size. Techniques disclosed herein may be used for supporting high reliability in distributed communication systems with dynamic topologies, including sidelink NR V2X communication systems.

Figure 2:
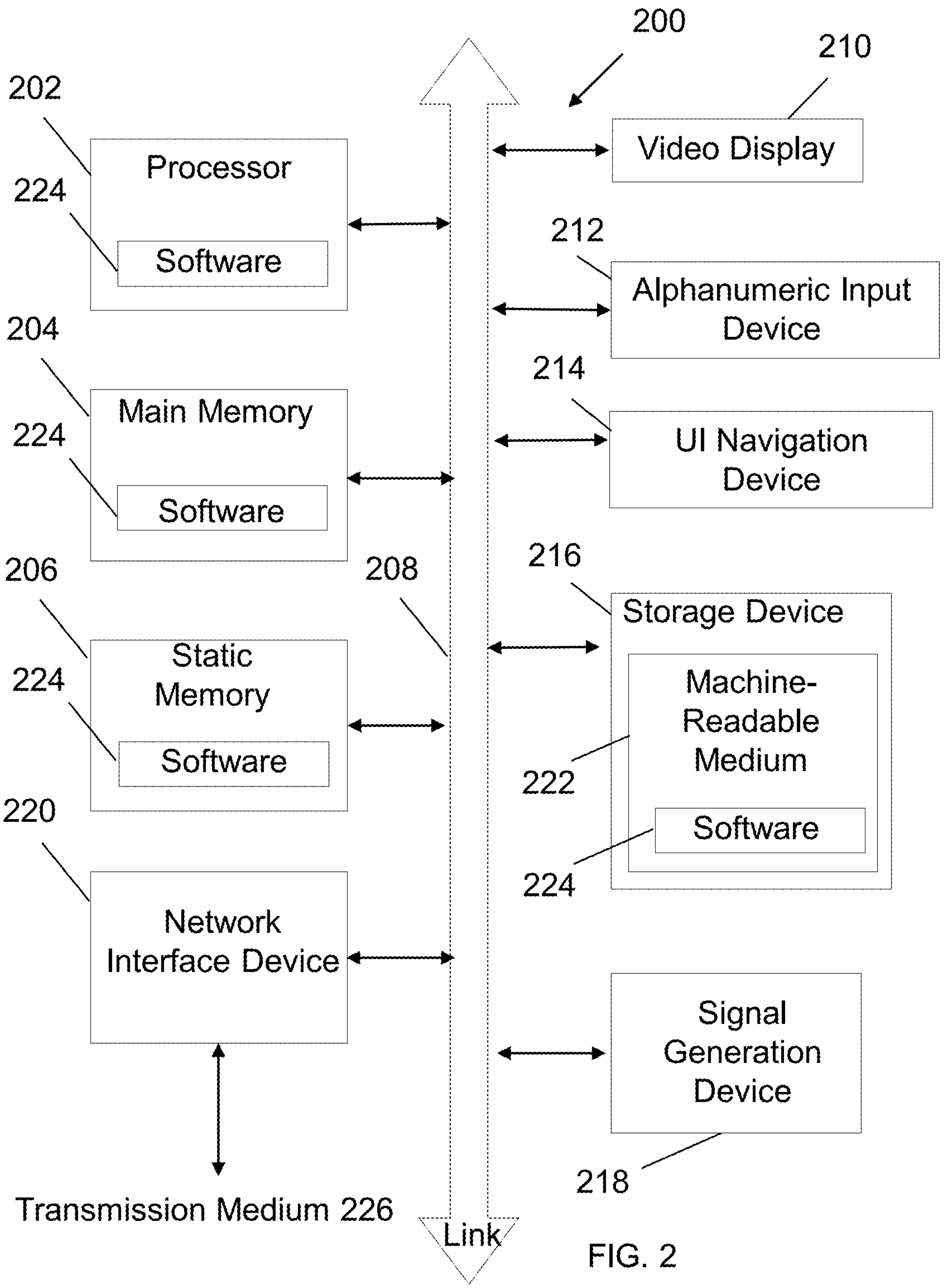
FIG. 2 illustrates a block diagram of a communication device in accordance with some embodiments.

FIG. 2 illustrates a block diagram of a communication device in accordance with some embodiments. The communication device 200 may be a UE such as a specialized computer, a personal or laptop computer (PC), a tablet PC, or a smart phone, dedicated network equipment such as an eNB, a server running software to configure the server to operate as a network device, a virtual device, or any machine capable of executing instructions (sequential or otherwise) that specify actions to be taken by that machine. For example, the communication device 200 may be implemented as one or more of the devices shown in FIGS. 1A-1C. Note that communications described herein may be encoded before transmission by the transmitting entity (e.g., UE, gNB) for reception by the receiving entity (e.g., gNB, UE) and decoded after reception by the receiving entity.

Examples, as described herein, may include, or may operate on, logic or a number of components, modules, or mechanisms. Modules and components are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" (and "component") is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The communication device 200 may include a hardware processor (or equivalently processing circuitry) 202 (e.g., a central processing unit (CPU), a GPU, a hardware processor core, or any combination thereof), a main memory 204 and a static memory 206, some or all of which may communicate with each other via an interlink (e.g., bus) 208. The main memory 204 may contain any or all of removable storage and non-removable storage, volatile memory or non-volatile memory. The communication device 200 may further include a display unit 210 such as a video display, an alphanumeric input device 212 (e.g., a keyboard), and a user interface (UI) navigation device 214 (e.g., a mouse). In an example, the display unit 210, input device 212 and UI navigation device 214 may be a touch screen display. The communication device 200 may additionally include a storage device (e.g., drive unit) 216, a signal generation device 218 (e.g., a speaker), a network interface device 220, and one or more sensors, such as a global positioning system (GPS) sensor, compass, accelerometer, or another sensor. The communication device 200 may further include an output controller, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 216 may include a non-transitory machine readable medium 222 (hereinafter simply referred to as machine readable medium) on which is stored one or more sets of data structures or instructions 224 (e.g., software) embodying or utilized by any one or more of the techniques or functions described herein. The non-transitory machine readable medium 222 is a tangible medium. The instructions 224 may also reside, completely or at least partially, within the main memory 204, within static memory 206, and/or within the hardware processor 202 during execution thereof by the communication device 200. While the machine readable medium 222 is illustrated as a single medium, the term "machine readable medium" may include a single medium or multiple media (e.g., a centralized or distributed database, and/or associated caches and servers) configured to store the one or more instructions 224.

The term "machine readable medium" may include any medium that is capable of storing, encoding, or carrying instructions for execution by the communication device 200 and that cause the communication device 200 to perform any one or more of the techniques of the present disclosure, or that is capable of storing, encoding or carrying data structures used by or associated with such instructions. Non-limiting machine-readable medium examples may include solid-state memories, and optical and magnetic media. Specific examples of machine-readable media may include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks.

The instructions 224 may further be transmitted or received over a communications network using a transmission medium 226 via the network interface device 220 utilizing any one of a number of wireless local area network (WLAN) transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks. Communications over the networks may include one or more different protocols, such as Institute of Electrical and Electronics Engineers (IEEE) 802.11 family of standards known as Wi-Fi, IEEE 802.16 family of standards known as WiMax, IEEE 802.15.4 family of standards, a Long Term Evolution (LTE) family of standards, a Universal Mobile Telecommunications System (UMTS) family of standards, peer-to-peer (P2P) networks, a next generation (NG)/5$^{th}$ generation (5G) standards among others. In an example, the network interface device 220 may include one or more physical jacks (e.g., Ethernet, coaxial, or phone jacks) or one or more antennas to connect to the transmission medium 226.

Note that the term "circuitry" as used herein refers to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable SoC), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" or "processor" as used herein thus refers to, is part of, or includes circuitry capable of sequentially and automatically carrying out a sequence of arithmetic or logical operations, or recording, storing, and/or transferring digital data. The term "processor circuitry" or "processor" may refer to one or more application processors, one or more baseband processors, a physical central processing unit (CPU), a single- or multi-core processor, and/or any other device capable of executing or otherwise operating computer-executable instructions, such as program code, software modules, and/or functional processes.

Any of the radio links described herein may operate according to any one or more of the following radio communication technologies and/or standards including but not limited to: a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology, for example Universal Mobile Telecommunications System (UMTS), Freedom of Multimedia Access (FOMA), 3GPP Long Term Evolution (LTE), 3GPP Long Term Evolution Advanced (LTE Advanced), Code division multiple access 2000 (CDMA2000), Cellular Digital Packet Data (CDPD), Mobitex, Third Generation (3G), Circuit Switched Data (CSD), High-Speed Circuit-Switched Data (HSCSD), Universal Mobile Telecommunications System (Third Generation) (UMTS (3G)), Wideband Code Division Multiple Access (Universal Mobile Telecommunications System) (W-CDMA (UMTS)), High Speed Packet Access (HSPA), High-Speed Downlink Packet Access (HSDPA), High-Speed Uplink Packet Access (HSUPA), High Speed Packet Access Plus (HSPA+), Universal Mobile Telecommunications System-Time-Division Duplex (UMTS-TDD), Time Division-Code Division Multiple Access (TD-CDMA), Time Division-Synchronous Code Division Multiple Access (TD-CDMA), 3rd Generation Partnership Project Release 8 (Pre-4th Generation) (3GPP Rel. 8 (Pre-4G)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 13), 3GPP Rel. 14 (3rd Generation Partnership Project Release 14), 3GPP Rel. 15 (3rd Generation Partnership Project Release 15), 3GPP Rel. 16 (3rd Generation Partnership Project Release 16), 3GPP Rel. 17 (3rd Generation Partnership Project Release 17) and subsequent Releases (such as Rel. 18, Rel. 19, etc.), 3GPP 5G, 5G, 5G New Radio (5G NR), 3GPP 5G New Radio, 3GPP LTE Extra, LTE-Advanced Pro, LTE Licensed-Assisted Access (LAA), MuLTEfire, UMTS Terrestrial Radio Access (UTRA), Evolved UMTS Terrestrial Radio Access (E-UTRA), Long Term Evolution Advanced (4th Generation) (LTE Advanced (4G)), cdmaOne (2G), Code division multiple access 2000 (Third generation) (CDMA2000 (3G)), Evolution-Data Optimized or Evolution-Data Only (EV-DO), Advanced Mobile Phone System (1st Generation) (AMPS (1G)), Total Access Communication System/Extended Total Access Communication System (TACS/ETACS), Digital AMPS (2nd Generation) (D-AMPS (2G)), Push-to-talk (PTT), Mobile Telephone System (MTS), Improved Mobile Telephone System (IMTS), Advanced Mobile Telephone System (AMTS), OLT (Norwegian for Offentlig Landmobil Telefoni, Public Land Mobile Telephony), MTD (Swedish abbreviation for Mobiltelefonisystem D, or Mobile telephony system D), Public Automated Land Mobile (Autotel/PALM), ARP (Finnish for Autoradiopuhelin, "car radio phone"), NMT (Nordic Mobile Telephony), High capacity version of NTT (Nippon Telegraph and Telephone) (Hicap), Cellular Digital Packet Data (CDPD), Mobitex, DataTAC, Integrated Digital Enhanced Network (iDEN), Personal Digital Cellular (PDC), Circuit Switched Data (CSD), Personal Handy-phone System (PHS), Wideband Integrated Digital Enhanced Network (WiDEN), iBurst, Unlicensed Mobile Access (UMA), also referred to as 3GPP Generic Access Network, or GAN standard), Zigbee, Bluetooth®, Wireless Gigabit Alliance (WiGig) standard, mmWave standards in general (wireless systems operating at 10-300 GHz and above such as WiGig, IEEE 802.11ad, IEEE 802.11ay, etc.), technologies operating above 300 GHz and THz bands, (3GPP/LTE based or IEEE 802.11p or IEEE 802.11bd and other) Vehicle-to-Vehicle (V2V) and Vehicle-to-X (V2X) and Vehicle-to-Infrastructure (V2I) and Infrastructure-to-Vehicle (12V)

communication technologies, 3GPP cellular V2X, DSRC (Dedicated Short Range Communications) communication systems such as Intelligent-Transport-Systems and others (typically operating in 5850 MHz to 5925 MHz or above (typically up to 5935 MHz following change proposals in CEPT Report 71)), the European ITS-G5 system (i.e. the European flavor of IEEE 802.11p based DSRC, including ITS-G5A (i.e., Operation of ITS-G5 in European ITS frequency bands dedicated to ITS for safety related applications in the frequency range 5,875 GHz to 5,905 GHZ), ITS-G5B (i.e., Operation in European ITS frequency bands dedicated to ITS non-safety applications in the frequency range 5,855 GHz to 5,875 GHz), ITS-G5C (i.e., Operation of ITS applications in the frequency range 5,470 GHz to 5,725 GHZ)), DSRC in Japan in the 700 MHz band (including 715 MHz to 725 MHZ), IEEE 802.11bd based systems, etc.

Aspects described herein may be used in the context of any spectrum management scheme including dedicated licensed spectrum, unlicensed spectrum, license exempt spectrum, (licensed) shared spectrum (such as LSA=Licensed Shared Access in 2.3-2.4 GHz, 3.4-3.6 GHz, 3.6-3.8 GHz and further frequencies and SAS=Spectrum Access System/CBRS=Citizen Broadband Radio System in 3.55-3.7 GHZ and further frequencies). Applicable spectrum bands include IMT (International Mobile Telecommunications) spectrum as well as other types of spectrum/bands, such as bands with national allocation (including 450-470 MHz, 902-928 MHz (note: allocated for example in US (FCC Part 15)), 863-868.6 MHz (note: allocated for example in European Union (ETSI EN 300 220)), 915.9-929.7 MHz (note: allocated for example in Japan), 917-923.5 MHz (note: allocated for example in South Korea), 755-779 MHz and 779-787 MHz (note: allocated for example in China), 790-960 MHZ, 1710-2025 MHz, 2110-2200 MHz, 2300-2400 MHz, 2.4-2.4835 GHz (note: it is an ISM band with global availability and it is used by Wi-Fi technology family (11b/g/n/ax) and also by Bluetooth), 2500-2690 MHZ, 698-790 MHZ, 610-790 MHz, 3400-3600 MHZ, 3400-3800 MHZ, 3800-4200 MHz, 3.55-3.7 GHZ (note: allocated for example in the US for Citizen Broadband Radio Service), 5.15-5.25 GHz and 5.25-5.35 GHz and 5.47-5.725 GHz and 5.725-5.85 GHz bands (note: allocated for example in the US (FCC part 15), consists four U-NII bands in total 500 MHz spectrum), 5.725-5.875 GHZ (note: allocated for example in EU (ETSI EN 301 893)), 5.47-5.65 GHz (note: allocated for example in South Korea, 5925-7125 MHz and 5925-6425 MHz band (note: under consideration in US and EU, respectively. Next generation Wi-Fi system is expected to include the 6 GHz spectrum as operating band, but it is noted that, as of December 2017, Wi-Fi system is not yet allowed in this band. Regulation is expected to be finished in 2019-2020 time frame), IMT-advanced spectrum, IMT-2020 spectrum (expected to include 3600-3800 MHZ, 3800-4200 MHZ, 3.5 GHz bands, 700 MHz bands, bands within the 24.25-86 GHz range, etc.), spectrum made available under FCC's "Spectrum Frontier" 5G initiative (including 27.5-28.35 GHz, 29.1-29.25 GHz, 31-31.3 GHz, 37-38.6 GHZ, 38.6-40 GHz, 42-42.5 GHZ, 57-64 GHz, 71-76 GHz, 81-86 GHz and 92-94 GHz, etc.), the ITS (Intelligent Transport Systems) band of 5.9 GHZ (typically 5.85-5.925 GHZ) and 63-64 GHZ, bands currently allocated to WiGig such as WiGig Band 1 (57.24-59.40 GHZ), WiGig Band 2 (59.40-61.56 GHZ) and WiGig Band 3 (61.56-63.72 GHZ) and WiGig Band 4 (63.72-65.88 GHZ), 57-64/66 GHz (note: this band has near-global designation for Multi-Gigabit Wireless Systems (MGWS)/WiGig. In US (FCC part 15) allocates total 14 GHZ spectrum, while EU (ETSI EN 302 567 and ETSI EN 301 217-2 for fixed P2P) allocates total 9 GHz spectrum), the 70.2 GHz-71 GHz band, any band between 65.88 GHz and 71 GHz, bands currently allocated to automotive radar applications such as 76-81 GHz, and future bands including 94-300 GHz and above. Furthermore, the scheme may be used on a secondary basis on bands such as the TV White Space bands (typically below 790 MHZ) where in particular the 400 MHz and 700 MHz bands are promising candidates. Besides cellular applications, specific applications for vertical markets may be addressed such as PMSE (Program Making and Special Events), medical, health, surgery, automotive, low-latency, drones, etc. applications.

Figure 3:
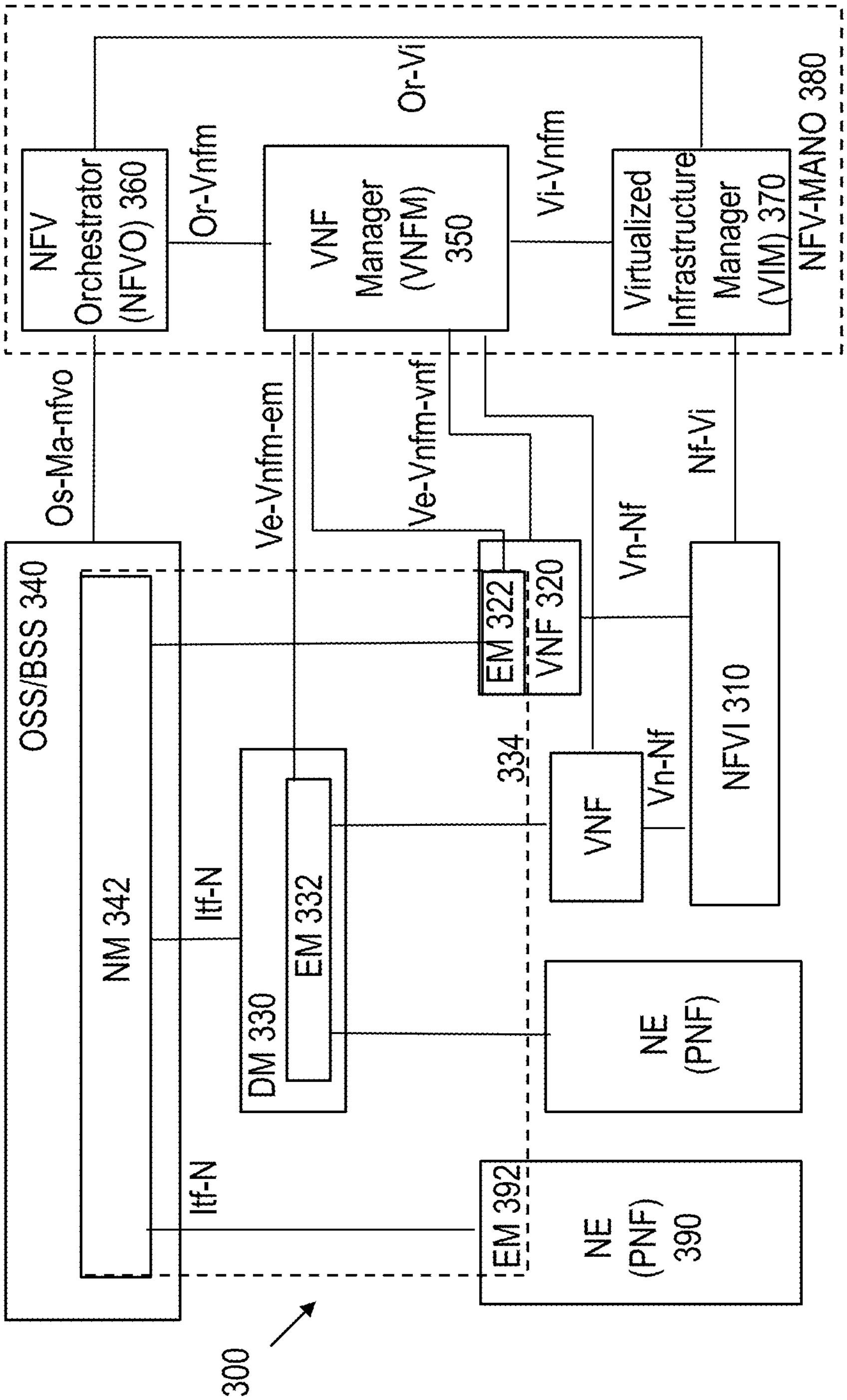
FIG. 3 illustrates an NFV network management architecture in accordance with some embodiments.

FIG. 3 illustrates an NFV network management architecture in accordance with some embodiments. As illustrated, the NFV network management architecture 300 may include a number of elements (each of which may contain physical and/or virtualized components), including a Network Function Virtualization Infrastructure (NFVI) 310, NetworkE (NEs) 390, Virtual Network Functions (VNFs) 320, a Domain Manager (DM) 330, an Element Manager (EM) 332, a Network Manager (NM) 342, and an NFV Management and Orchestration (NFV-MANO) 380. The NFV-MANO 380, which may be replaced as indicated herein by multiple NFV-MANOs, may comprise a Virtualized Infrastructure Manager (VIM) 370, a VNF Manager (VNFM) 350, and a Network Function Virtualization Orchestrator (NFVO) 360. The NM 342 may be contained in an Operations Support System/Business Support System (OSS/BSS) 320, with the DM 330 and NM 342 forming the 3GPP management system 334.

The NFV network management architecture 300 may be implemented by, for example, a data center comprising one or more servers in the cloud. The NFV network management architecture 300, in some embodiments, may include one or more physical devices and/or one or more applications hosted on a distributed computing platform, a cloud computing platform, a centralized hardware system, a server, a computing device, and/or an external network-to-network interface device, among others. In some cases, the virtualized resource performance measurement may include, for example, latency, jitter, bandwidth, packet loss, nodal connectivity, compute, network, and/or storage resources, accounting, fault and/or security measurements. In particular, the NEs 390 may comprise physical network functions (PNF) including both hardware such as processors, antennas, amplifiers, transmit and receive chains, as well as software. The VNFs 320 may be instantiated in one or more servers. Each of the VNFs 320, DM 330 and the NEs 390 may contain an EM 322, 332, 392.

The NFV Management and Orchestration (NFV-MANO) 380 may manage the NFVI 310. The NFV-MANO 380 may orchestrate the instantiation of network services, and the allocation of resources used by the VNFs 320. The NFV-MANO 380 may, along with the OSS/BSS 340, be used by external entities to deliver various NFV business benefits. The OSS/BSS 340 may include the collection of systems and management applications that a service provider may use to operate their business: management of customers, ordering, products and revenues—for example, payment or account transactions, as well as telecommunications network components and supporting processes including network component configuration, network service provisioning and fault handling. The NFV-MANO 380 may create or terminate a VNF 320, increase or decrease the VNF capacity, or update or upgrade software and/or configuration of a VNF. The NFV-MANO 380 may have access to various data repositories including network services, VNFs available, NFV instances and NFVI resources with which to determine resource allocation.

The VIM 370 may control and manage the NFVI resources via Nf-Vi reference points within the infrastructure sub-domain. The VIM 370 may further collect and forward performance measurements and events to the VNFM 350 via Vi-VNFM and to the NFVO 360 via Or-Vi reference points. The NFVO 360 may be responsible for managing new VNFs and other network services, including lifecycle management of different network services, which may include VNF instances, global resource management, validation and authorization of NFVI resource requests and policy management for various network services. The NFVO 360 may coordinate VNFs 320 as part of network services that jointly realize a more complex function, including joint instantiation and configuration, configuring required connections between different VNFs 320, and managing dynamic changes of the configuration. The NFVO 360 may provide this orchestration through an OS-Ma-NFVO reference point with the NM 342. The VNFM 350 may orchestrate NFVI resources via the VIM 370 and provide overall coordination and adaptation for configuration and event reporting between the VNFM 350 and the EMs and NM. The former may involve discovering available services, managing virtualized resource availability/allocation/release and providing virtualized resource fault/performance management. The latter may involve lifecycle management that may include instantiating a VNF, scaling and updating the VNF instances, and terminating the network service, releasing the NFVI resources for the service to the NFVI resource pool to be used by other services.

The VNFM 350 may be responsible for the lifecycle management of the VNFs 320 via the Ve-VNFM-VNF reference point and may interface to EMs 322, 332 through the Ve-VNFM—EM reference point. The VNFM 350 may be assigned the management of a single VNF 320, or the management of multiple VNFs 320 of the same type or of different types. Thus, although only one VNFM 350 is shown in FIG. 3, different VNFMs 350 may be associated with the different VNFs 320 for performance measurement and other responsibilities. The VNFM 350 may provide a number of VNF functionalities, including instantiation (and configuration if required by the VNF deployment template), software update/upgrade, modification, scaling out/in and up/down, collection of NFVI performance measurement results and faults/events information and correlation to VNF instance-related events/faults, healing, termination, lifecycle management change notification, integrity management, and event reporting.

The VIM 370 may be responsible for controlling and managing the NFVI compute, storage and network resources, usually within one operator's Infrastructure Domain. The VIM 370 may be specialized in handling a certain type of NFVI resource (e.g. compute-only, storage-only, networking-only), or may be capable of managing multiple types of NFVI resources. The VIM 370 may, among others, orchestrate the allocation/upgrade/release/reclamation of NFVI resources (including the optimization of such resources usage) and manage the association of the virtualized resources to the physical compute, storage, networking resources, and manage repository inventory-related information of NFVI hardware resources (compute, storage, networking) and software resources (e.g. hypervisors), and discovery of the capabilities and features (e.g. related to usage optimization) of such resources.

The NFVI 310 may itself contain various virtualized and non-virtualized resources. These may include a plurality of virtual machines (VMs) that may provide computational abilities (CPU), one or more memories that may provide storage at either block or file-system level and one or more networking elements that may include networks, subnets, ports, addresses, links and forwarding rules to ensure intra- and inter-VNF connectivity.

Each VNF 320 may provide a network function that is decoupled from infrastructure resources (computational resources, networking resources, memory) used to provide the network function. Although not shown, the VNFs 320 can be chained with other VNFs 320 and/or other physical network function to realize a network service. The virtualized resources may provide the VNFs 320 with desired resources. Resource allocation in the NFVI 310 may simultaneously meet numerous requirements and constraints, such as low latency or high bandwidth links to other communication endpoints.

The VNFs 320, like the NEs 390 may be managed by one or more EMs 322, 332, 392. The EM may provide functions for management of virtual or physical network elements, depending on the instantiation. The EM may manage individual network elements and network elements of a sub-network, which may include relations between the network elements. For example, the EM 322 of a VNF 320 may be responsible for configuration for the network functions provided by a VNF 320, fault management for the network functions provided by the VNF 320, accounting for the usage of VNF functions, and collecting performance measurement results for the functions provided by the VNF 320.

The EMs 322, 332, 392 (whether in a VNF 320 or NE 390) may be managed by the NM 342 of the OSS/BSS 340 through Itf-N reference points. The NM 342 may provide functions with the responsibility for the management of a network, mainly as supported by the EM 332 but may also involve direct access to the network elements. The NM 342 may connect and disconnect VNF external interfaces to physical network function interfaces at the request of the NFVO 360.

The various components of the system may be connected through different reference points. The references points between the NFV-MANO 380 and the functional blocks of the system may include an Os-Ma-NFVO between the NM 342 and NFVO 360, a Ve-VNFM-EM between the EM 322, 332 and the VNFM 350, a Ve-VNFM-VNF between a VNF 320 and the VNFM 350, a Nf-Vi between the NFVI 310 and the VIM 370, an Or-VNFM between the NFVO 360 and the VNFM 350, an Or-Vi between the NFVO 360 and the VIM 370, and a Vi-VNFM between the VIM 370 and the VNFM 350. An Or-Vi interface may implement the VNF software image management interface and interfaces for the management of virtualized resources, their catalogue, performance and failure on the Or-Vi reference point. An Or-Vnfm interface may implement a virtualized resource management interface on the Or-Vnfm reference point. A Vi-Vnfm interface may implement a virtualized resource performance/fault management on the Vi-Vnfm reference point.

Figure 4:
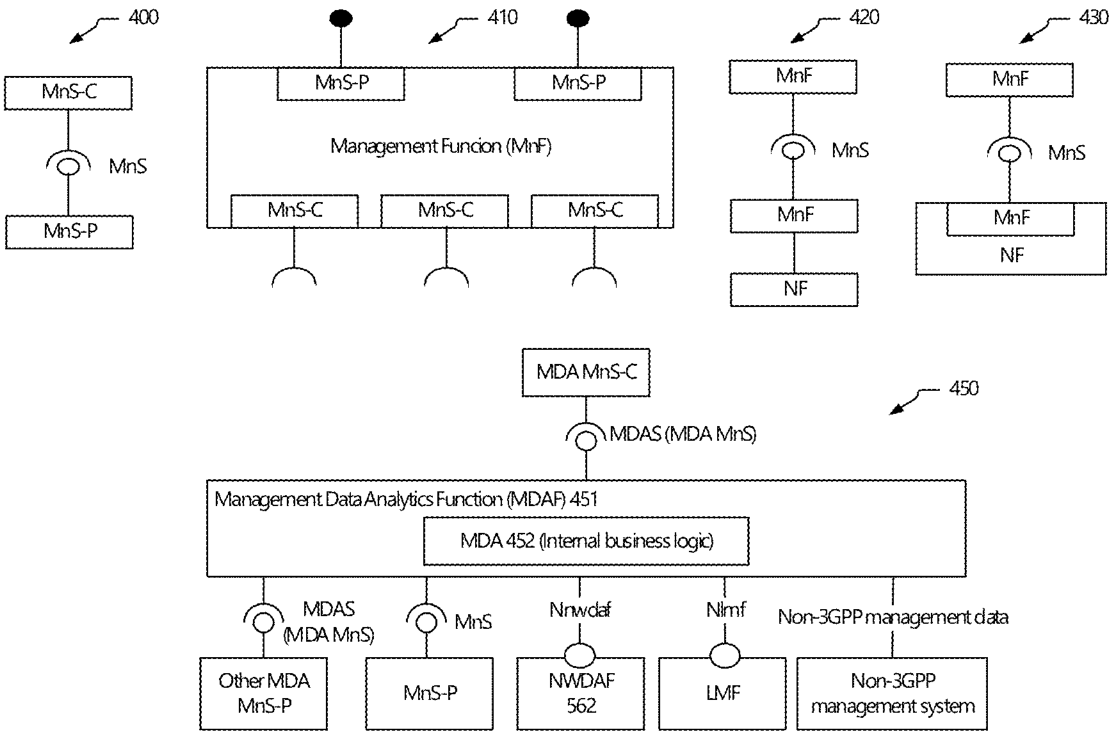
FIG. 4 illustrates example MnS deployments in accordance with some embodiments.

FIG. 4 illustrates example MnS deployments in accordance with some embodiments. As above, MnS is a Service Based Management Architecture (SBMA). An MnS is a set of offered management capabilities (e.g., capabilities for management and orchestration (MANO) of network and services). The entity producing an MnS is referred to as an MnS producer (MnS-P) and the entity consuming an MnS is referred to as an MnS-C. An MnS provided by an MnS-P can be consumed by any entity with appropriate authorization and authentication. As shown by the general interaction 400 in FIG. 4, the MnS-P offers its services via a standardized service interface composed of individually specified MnS components (e.g., MnS-C).

A MnS is specified using different independent components. A concrete MnS includes at least two of these components. Three different component types are defined, including MnS component type A, MnS component type B, and MnS component type C. An MnS component type A is a group of management operations and/or notifications that is agnostic with regard to the entities managed. The operations and notifications as such are hence not involving any information related to the managed network. These operations and notifications are called generic or network agnostic. For example, operations for creating, reading, updating and deleting managed object instances, where the managed object instance to be manipulated is specified only in the signature of the operation, are generic. An MnS component type B refers to management information represented by information models representing the managed entities. An MnS component type B is also called Network Resource Model (NRM) (see e.g., 3GPP TS 28.622, 3GPP TS 28.541). MnS component type C is performance information of the managed entity and fault information of the managed entity. Examples of management service component type C include alarm information (see e.g., 3GPP TS 28.532 and 3GPP TS 28.545) and performance data (see e.g., 3GPP TS 28.552, 3GPP TS 28.554, and 3GPP TS 32.425).

An MnS-P is described by a set of metadata called MnS-P profile. The profile holds information about the supported MnS components and their version numbers. This may include also information about support of optional features. For example, a read operation on a complete subtree of managed object instances may support applying filters on the scoped set of objects as optional feature. In this case, the MnS profile should include the information if filtering is supported.

FIG. 4 also depicts example MnF deployments. The MnF is a logical entity playing the roles of MnS-C and/or MnS-P. An MnF with the role of management service exposure governance is referred to as an "Exposure governance management function" or "exposure governance MnF". An MnS produced by an MnF may have multiple consumers. The MnF may consume multiple MnS from one or multiple MnS-Ps. In the MnF deployment 410, the MnF plays both roles (e.g., MnS-P and MnS-C).

An MnF can be deployed as a separate entity or embedded in a network function (NF) to provide MnS(s). For example, one MnF deployment scenario 420 in FIG. 4 shows an example where the MnF is deployed as a separate entity to provide MnS(s). In another MnF deployment scenario 830 an MnF is embedded in an NF to provide MnS(s). In these examples, the MnFs may interact by consuming MnS produced by other MnFs.

FIG. 8 also depicts an example MDA service (MDAS or MDA MnS) deployment 850. Management data analytics (MDA), as a key enabler of automation and intelligence, is considered a foundational capability for mobile networks and services management and orchestration. The MDA provides a capability of processing and analysing data related to network and service events and status including, for example, performance measurements, KPIs, trace data, MDT reports, radio link failure (RLF) reports, RRC connection establishment failure event (RCEF) reports, QoE reports, alarms, configuration data, network analytics data, and service experience data from AFs, and/or the like, to provide analytics output, (e.g., statistics, predictions, inferences, root cause analysis issues, and/or the like), and may also include recommendations to enable necessary actions for network and service operations. The MDA output is provided by the MDAS-P to the corresponding consumer(s) (e.g., MDAS-C/MDA MnS-C) that requested the analytics.

The MDA can identify ongoing issues impacting the performance of the network and services and help to identify in advance potential issues that may cause potential failure and/or performance degradation. The MDA can also assist to predict the network and service demand to enable the timely resource provisioning and deployments which would allow fast time-to-market network and service deployments. The MDAS includes the services exposed by the MDA, which can be consumed by various consumers including, for example, MnFs (e.g., MnS-Ps and/or MnS-Cs for network and service management), NFs (e.g., NWDAF and/or any other NFs/NEs discussed herein), SON functions, network and service optimization tools/functions, SLS assurance functions, human operators, AFs, and/or the like. For purposes of the present disclosure, the terms MDAS and MDA MnS may be used interchangeably.

The MDAS in the context of SBMA enables any authorized consumer to request and receive analytics. A management function (e.g., Management Data Analytics Function (MDAF)) may play the roles of MDA MnS-P, MDA MnS-C, other MnS-C, NWDAF consumer, and Location Management Function (LMF) service consumer, and may also interact with other non-3GPP management systems. In some implementations, multiple MDA instances may be deployed according to deployment needs (see e.g., 3GPP TS 28.104 § 5.3).

The internal business logic related to MDA leverages current and historical data related to: performance measurements (PM) as per 3GPP TS 28.552 and/or KPIs as per 3GPP TS 28.554; trace data (e.g., MDT, RLF, RCEF) as per 3GPP TS 32.422 and TS 32.423; QoE and service experience data as per 3GPP TS 28.405 and 3GPP TS 28.406; analytics data offered by an NWDAF as per 3GPP TS 23.288 including 5GC data and external web/app-based information (e.g., web crawler that provides online news) from an AF; alarm information and notifications as per 3GPP TS 28.532; CM information and notifications; UE location information provided by LMF as per 3GPP TS 23.273; MDA reports from other MDA MnS-Ps; and management data from non-3GPP systems. Additionally or alternatively, the MDAF and/or the MDA internal business logic includes the MDA capability for the UE level measurements discussed herein.

Analytics output from the MDA internal business logic are made available by the management functions (e.g., MDAFs) playing the role of MDA MnS-Ps to authorized consumers including, but not limited to, other MnFs, NFs/NEs, NWDAF, SON functions, optimization tools, and human operators. Historical analytics reports may be saved and retrieved for use at later times by an MDA MnS-C, and historical analytics input (enabling) data (along with current analytics input data) may be used for analytics by MDA MnS-P. Such a historical data usage may be applicable to both or one of the MDA MnS-P and MDA MnS-C side. In some examples, "historical data" refers to (a) historical analytics reports that have been produced in the past, and (b) historical analytics input (enabling) data that had been collected in the past. In some examples, the historical analytics includes or is based on UE level measurements discussed herein.

In some implementations, the MDA MnS-P provides analytics data for management purposes based on input data related to different types of NFs or entities in the network (e.g., data reported from gNB and/or specific NF(s) (e.g., CN NFs)). Depending on the use case and when to be used, the MDA MnS-P may use the analytics results produced by NWDAF as input. In these implementations, the MDAF may act as 3GPP domain-specific (e.g. RAN or CN) or as 3GPP cross-domain MDA MnS-P, and may involve coordination between an NWDAF, NAN(s), and MDA MnS-P(s) for data analytics purposes (see e.g., 3GPP TS 28.104 § 5.2).

In some implementations, the MDA MnS-P provides analytics with respect to a particular network context (e.g., network status) under which data is collected to produce analytics. For example, a prediction of load in an area of interest may differ when all NAN(s) and potential additional RATs are operating compared to case where certain NAN(s) or other RATs are experiencing a fault or are powered off to save energy. The analytics conducted and produced by the MDA MnS-P for these two example scenarios would be different and directly affected by the specific status of network. Although the network status (context) affects the produced analytics conducted by the MDA producer, awareness of the network context would fall on the consumer side to complement the obtained analytics results. This network context, reflecting network status at the time of enabling data collection, is important for the MDA MnS-C to understand the network conditions related to the obtained analytics and hence be able to use such analytics more efficiently.

The MDA MnS-C cannot expect the MDA producer to provide the network context, because the network context interest of each MDA MnS-C may differ depending on the usage and purpose of analytics. The usage can include a proprietary algorithm that assist a decision-making process. For example, a load balancing algorithm may use the load and mobility information among neighboring NAN(s) whereas other load balancing algorithms may also use load and mobility information from a greater geographical area.

In addition, the selection of the parameters and their combinations may prove to be impractical for the MDA MnS-P to prepare and provide. Hence, it is efficient for the MDA MnS-P to prepare only the MDA output without including any network context and allow the MDA MnS-C to obtain the required network context, to complement the obtained analytics, using conventional configuration management procedures as described in 3GPP TS 28.511 and 3GPP TS 28.531.

In some examples, the MDA process may utilize AI/ML technologies, such as any of those discussed herein. An MDAF may optionally be deployed as one or more AI/ML inference function(s) in which the relevant ML entities are used for inference per the corresponding MDA capability. Specifications for MDA ML entity training to enable ML entity deployments are given in 3GPP TS 28.105.

As above, an increasing number of network use cases are becoming dependent on the availability of per-UE measurements. Such use cases include, for example, management control loops (e.g., hybrid self-organizing network (SON), distributed SON (D-SON), centralized SON (C-SON)) and analytics and intelligence functions in the networks (e.g., Network Data Analytics Function (NWDAF), RAN intelligence functions).

Performance measurements (PMs) may focus on the measurements aggregated to an object (e.g., an NF, a cell, an interface), which serves all the relevant UEs (instead of the measurements for a particular UE). This aggregation reduces the overall amount of management data to be transferred and analyzed, and in some cases may permit keeping track of individual UEs to be avoided in order to evaluate the performance of a cell, an NF, an AF, and/or the like. Treating per-UE measurements as PMs may involve extending this concept to the focus on not only generalization and aggregation but also finer granularity. Therefore, defining the per-UE measurements using the methodology of traditional PMs is challenging and potentially obfuscate the concept of PMs.

Key Performance Indicators (KPIs) extend the concept of PM in the direction of data aggregation. While PMs are aggregated across multiple UEs at the level of a MeasuredObject, the KPIs further aggregate the data across multiple instances of MeasuredObjects of the same or different types. The focus of KPI standardization is definition of standardized aggregation formulas and data (typically PM) sources.

One way of handling per-UE measurements in 3GPP SA5 specifications is minimization drive test (MDT) (see e.g., 3GPP TS 37.320 ("[TS37320]")) measurements, in which the measurements are: the measurements are performed either at the UE or at the base station; the measurements are performed, collected, and reported per UE; the measurements are collected and reported using trace mechanisms (see e.g., 3GPP TS 32.422); and/or the measurements used outside of the 3GPP network are subject to user consent and may use anonymization.

The challenges for UE level measurements data collection posed by modern use cases across 5GC and NG-RAN include the collection of per-UE measurements in both the NG-RAN and 5GC, no aggregation and/or anonymization should be applied to the collected data in order to maintain its value for various AI/ML data consumers, measurement definitions may be unable to be limited to RAN only (e.g., not all use cases are RAN-centric), a common methodology is to be applied for per-UE measurements in both NG-RAN and 5GC; the per-UE measurements should be accessible by 3GPP network and management functions and non-3GPP defined functions or entities; and the per-UE measurements should to be easy to consume (i.e., collect and report), by any potential consumers.

Techniques and technologies for UE level measurement collection for the 5GS are disclosed herein. The present disclosure provides service-based technologies and techniques for UE level measurement collection, which are applicable for UE level measurement collection for both 5GC and NG-RAN. The UE level measurements can be used to enable AI/ML applications/use cases in the 5G system (5GS), e.g., as training data, testing data, validation data, inference data, and/or the like.

The embodiments herein are related to wireless communication, cellular networks, cloud computing, edge computing, data centers, network topologies, and communication system implementations, and AI/ML technologies. In particular, the embodiments are related to technologies for per QoS flow per UE measurements on a one-way delay (OWD) between a UE and a PSF UPF and/or packet data unit (PDU) session anchor (PSA) UPF.

In 5G networks, the downlink (DL)/uplink (UL) delay between a UE and PSA UPF has direct and/or indirect impact to user experience for services such as Ultra-Reliable Low Latency Communications (URLLC). For environments in which a PSA UPF and NG-RAN are time synchronized, the DL/UL delay per QoS flow per UE between the PSA UPF and the UE can be measured at the PSA UPF.

For UL specifically, the UL packet delay in the NG-RAN may be measured by a RAN node with or without the D1 UL Packet Data Convergence Protocol (PDCP) delay (UL PDCP packet average delay) occurred in the UE included (see e.g., 3GPP TS 38.415). Therefore, separate measurements may be used to monitor the integrated UL packet delay between the PSA UPF and the UE: one in which D1 is included and another in which D1 is excluded. D1 is the wait time (queue) in the UE.

The per QoS flow per UE measurements on the DL/UL one-way delay between the PSA UPF and a NE (e.g., UE and/or some other NE discussed herein) can be used to analyze user plane delay performance in 5G networks and user experience, and to support the analytics related to end-to-end data volume transfer time conducted by the NWDAF.

Figure 5:
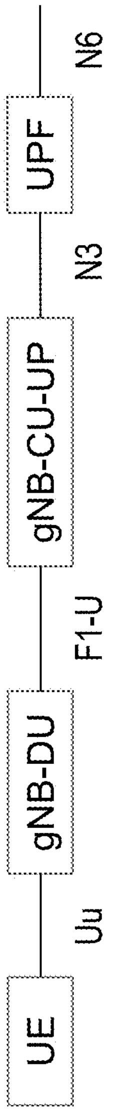
FIG. 5 illustrates user plane interfaces in accordance with some embodiments.

FIG. 5 illustrates user plane interfaces in accordance with some embodiments. In particular, FIG. 5 shows an example of UP interfaces between a UE and a UPF (or PSA UPF). Here, an air interface (Uu) is between the UE and gNB-DU, an F1 UP interface (F1-U) interface is between the gNB-DU and a gNB-CU-UP, an N3 interface is between the gNB-CU-UP and the UPF (or PSA UPF), and an N6 interface is between the UPF (or PSA UPF) and a DN.

5G Nf Performance Measurements Collection and Generation Aspects

Figure 6A:
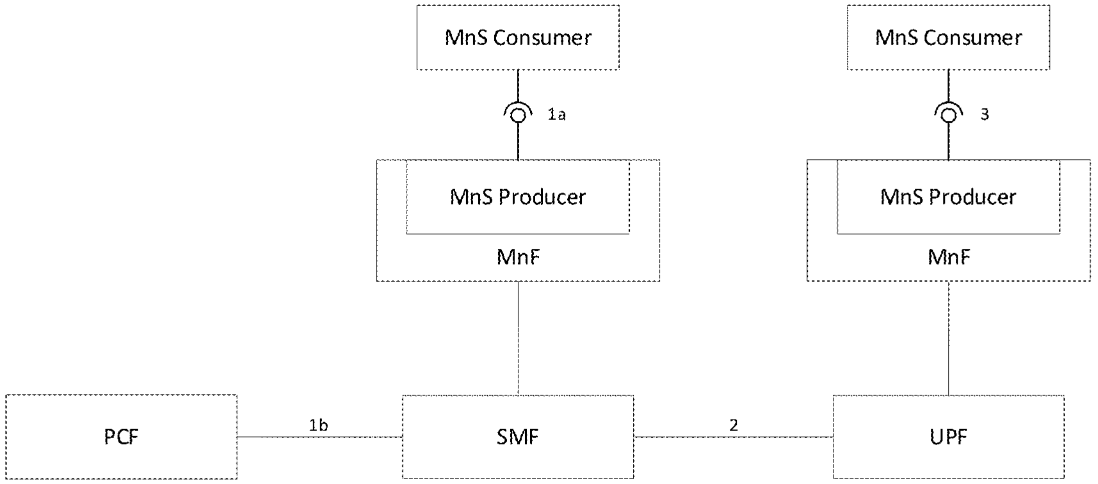
FIG. 6A illustrates an example of a per quality of service (QOS) flow per UE measurements collection method in accordance with some embodiments.
Figure 6B:
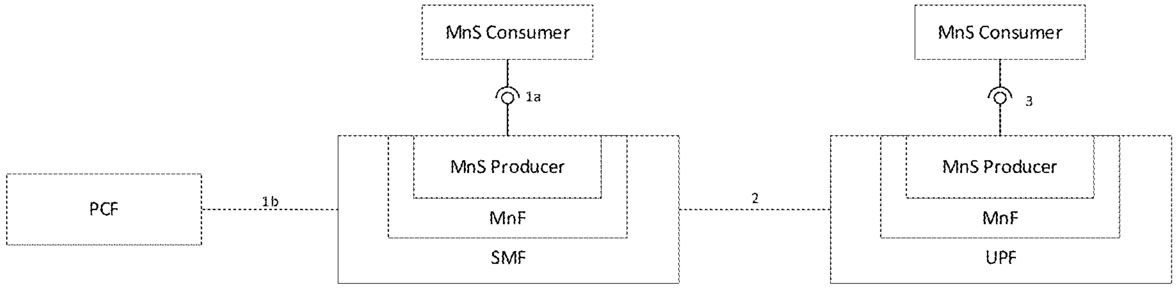
FIG. 6B illustrates another example of a per quality of service (QoS) flow per UE measurements collection method in accordance with some embodiments.
Figure 6C:
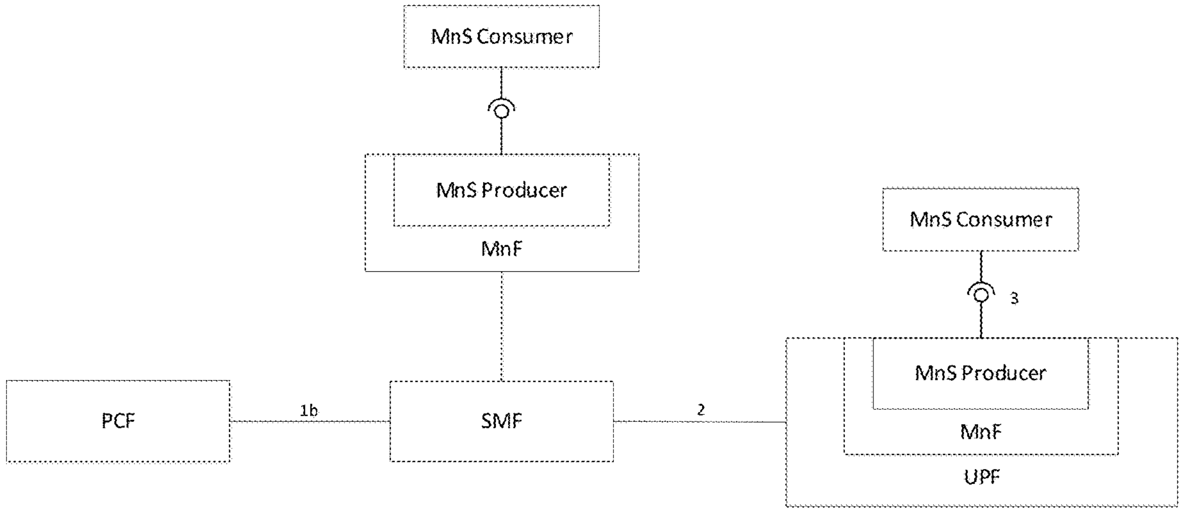
FIG. 6C illustrates another example of a per QoS flow per UE measurements collection method in accordance with some embodiments.

FIG. 6A illustrates an example of a per QoS flow per UE measurements collection method in accordance with some embodiments. FIG. 6B illustrates another example of a per QoS flow per UE measurements collection method in accordance with some embodiments. FIG. 6C illustrates another example of a per QoS flow per UE measurements collection method in accordance with some embodiments. In FIGS. 6A-6C, the UPF performs the per QoS Flow per UE QoS monitoring according to the QoS monitoring request (see, e.g., operation 2 in FIGS. 6A-6C) received from the SMF during a PDU Session Establishment or Modification procedure (see, e.g., 3GPP TS 23.501). The QoS monitoring can be initiated on the SMF by the management system (see step 1*a* in FIGS. 6A-6C) via a QFQoSMonitoringControl Managed Object Instance (MOI) (see 3GPP TS 28.541), or by the PCF (see step 1*b* in FIGS. 6A-6C) via QoS monitoring policy included in the Policy and Charging Control (PCC) rule provisioning (see e.g., 3GPP TS 23.503). The PSA UPF creates and sends the monitoring packets to the RAN according to the QoS monitoring request received from the SMF.

The PSA UPF generates measurement(s) based on the UE measurement job (e.g., the UEMeasurementJob MOI) created by the management system (see e.g., operation 3 in FIGS. 6A-6C).

The SMF and UPF may be managed by a management function (MnF). The MnF can be located outside the SMF (see e.g., FIGS. 6A and 6C), inside the SMF yx46 (see e.g., FIG. 6B), outside the UPF (see e.g., FIG. 6A), and/or inside the UPF (see e.g., FIGS. 6B and 6C). The MnF acts as a MnS-P which provides an MnS to a MnS-C.

Example Performance Measurements

The following performance measurements can be collected by the MnS consumer from the MnS producer.

Average DL Packet Delay Between PSA UPF and UE for a QoS Flow a) This measurement provides the average DL packet delay between the PSA UPF and UE for a QoS flow. In some examples, this measurement is only applicable to when the PSA UPF and NG-RAN are time synchronised.

b) In some examples, the collection method for this measurement is discrete event registration (DER) (n=1). DER refers to, when data related to a particular event is/are captured, every $n^{th}$ event is registered (see e.g., 3GPP TS 32.404).

c) In some examples, this measurement is obtained by the following method:

The UPF performs the per QoS Flow per UE QoS monitoring according to the QoS monitoring request received from the SMF during a PDU Session Establishment or Modification procedure (see e.g., 3GPP TS 23.501). The QoS monitoring can be initiated on the SMF by the management system via a QFQoSMonitoringControl MOI (see e.g., 3GPP TS 28.541), or by the PCF via a QoS Monitoring policy included in the PCC rule provisioning (see e.g., 3GPP TS 23.503). The PSA UPF creates and sends the monitoring packets to the RAN according to the QoS monitoring request received from the SMF.

The PSA UPF generates the measurement based on the UE measurement job (e.g., the UEMeasurementJob MOI) created by the management system:

For each received GTP PDU monitoring response packet (packet i) for QoS monitoring, the PSA UPF records the following time stamps and information included in the General Packet Radio System (GPRS) Tunnelling Protocol User Plane (GTP-U) header (see e.g., 3GPP TS 23.501 and 3GPP TS 38.415):

- T1 indicating the local time the DL GTP PDU monitoring packet was sent by the PSA UPF;
- T2 indicating the local time that the DL GTP PDU monitoring packet was received by NG-RAN;
- The DL Delay Result from the NG-RAN to the UE indicating the downlink delay measurement result, which is the sum of the delay incurred in the NG-RAN (including the delay at the gNB-CU-UP, on F1-U and on the gNB-DU) and the delay over the Uu interface (see e.g., 3GPP TS 38.415). The DL Delay Result is denoted by DRdl;
- The PSA UPF counts the number (N) of GTP PDU monitoring response packets for the QoS flow received in the granularity period, and determines:

$$\frac{\sum_{i=1}^{N}(T2_i - T1_i + DRdl_i)}{N}$$

- d) In some examples, each measurement is a real number representing the average delay in 0.1 ms.
- e) In some examples, the measurement type, short form measurement name, and/or filter name for this measurement is: GTP.DelayDlPsaUpfUeMean.
- f) In some examples, the measurement object class (MOC) for this measurement is: UPFFunction.
- g) In some examples, potential filter values for this measurement include: N4 Session Identifier, QoS Flow Identifier, Single Network Slice Selection Assistance Information (S-NSSAI), and/or 5G QoS Identifier (5QI).
- h) One use of this measurement is to support the end-to-end data volume transfer time analytics conducted by the NWDAF.

Average UL Packet Delay Between PSA UPF and UE for a QoS Flow (Excluding D1)

a) This measurement provides the average UL packet delay between the PSA UPF and the UE for a QoS flow, excluding the D1 UL PDCP delay occurred in the UE. In some examples, this measurement is only applicable when the PSA UPF and the NG-RAN are time synchronized.

b) In some examples, the collection method for this measurement is DER (n=1).

c) In some examples, this measurement is obtained by the following method:

The UPF performs the per QoS Flow per UE QoS monitoring according to the QoS monitoring request received from the SMF during a PDU Session Establishment or Modification procedure (see e.g., 3GPP TS 23.501). The QoS monitoring can be initiated on the SMF by the management system via a QFQoSMonitoringControl MOI (see e.g., 3GPP TS 28.541), or by the PCF via a QoS Monitoring policy included in the PCC rule provisioning (see e.g., 3GPP TS 23.503). The PSA UPF creates and sends the monitoring packets to the RAN according to the QoS monitoring request received from the SMF.

The PSA UPF generates the measurement based on the UE measurement job (e.g., the UEMeasurementJob MOI) created by the management system:

For each received GTP PDU monitoring response packet (packet i) for QoS monitoring, the PSA UPF records the following time stamps and information included in the GTP-U header (see e.g., 3GPP TS 23.501 and 3GPP TS 38.415):

T3 received in the GTP-U header of the monitoring response packet indicating the local time that the monitoring response packet was sent by the NG-RAN;

T4 indicating the local time that the monitoring response packet was received by the PSA UPF;

The UL Delay Result from the UE to the NG-RAN indicating the uplink delay measurement result, which is the sum of the delay incurred in the NG-RAN (including the delay at the gNB-CU-UP, on F1-U and on the gNB-DU) and the delay over the Uu interface (excluding the D1 UL PDCP delay occurred in the UE) (see e.g., 3GPP TS 38.415). The UL Delay Result is denoted by DRul;

The PSA UPF counts the number (N) of GTP PDU monitoring response packets for the QoS flow received in the granularity period, and determines:

$$\frac{\sum_{i=1}^{N}(T4_i - T3_i + DRul_i)}{N}$$

d) In some examples, each measurement is a real number representing the average delay in 0.1 ms.

e) In some examples, the measurement type, short form measurement name, and/or filter name for this measurement is: GTP.DelayUlPsaUpfUeMeanExcD1.

f) In some examples, the MOC for this measurement is: UPFFunction.

g) In some examples, potential filter values for this measurement include: N4 Session Identifier, QoS Flow Identifier, S-NSSAI, and/or 5QI.

h) One usage of this measurement is to support the end-to-end data volume transfer time analytics conducted by NWDAF.

Average UL Packet Delay Between PSA UPF and UE for A QoS FLOW (INCLUDING D1)

a) This measurement provides the average UL packet delay between the PSA UPF and the UE for a QoS flow, including the D1 UL PDCP delay occurred in the UE. In some examples, this measurement is only applicable when the PSA UPF and the NG-RAN are time synchronized.

b) In some examples, the collection method for this measurement is DER (n=1).

c) In some examples, this measurement is obtained by the following method:

The UPF performs the per QoS Flow per UE QoS monitoring according to the QoS monitoring request received from the SMF during a PDU Session Establishment or Modification procedure (see e.g., 3GPP TS 23.501). The QoS monitoring can be initiated on the SMF by the management system via a QFQoSMonitoringControl MOI (see e.g., 3GPP TS 28.541), or by the PCF via a QoS Monitoring policy included in the PCC rule provisioning (see e.g., 3GPP TS 23.503). The PSA UPF creates and sends the monitoring packets to the RAN according to the QoS monitoring request received from the SMF.

The PSA UPF generates the measurement based on the UE measurement job (e.g., the UEMeasurementJob MOI) created by the management system:

For each received GTP PDU monitoring response packet (packet i) for QoS monitoring, the PSA UPF records the following time stamps and information included in the GTP-U header (see e.g., 3GPP TS 23.501 and 3GPP TS 38.415):

T3 received in the GTP-U header of the monitoring response packet indicating the local time that the monitoring response packet was sent by the NG-RAN;

T4 indicating the local time that the monitoring response packet was received by the PSA UPF;

The UL Delay Result from the UE to the NG-RAN indicating the uplink delay measurement result, which is the sum of the delay incurred in the NG-RAN (including the delay at the gNB-CU-UP, on F1-U and on the gNB-DU), the delay over the Uu interface, and the D1 UL PDCP delay occurred in the UE (see e.g., 3GPP TS 38.415). The UL Delay Result is denoted by DRul;

The PSA UPF counts the number (N) of GTP PDU monitoring response packets for the QoS flow received in the granularity period, and determines:

$$\frac{\sum_{i=1}^{N}(T4_i - T3_i + DRul_i)}{N}$$

d) In some examples, each measurement is a real number representing the average delay in 0.1 ms.

e) In some examples, the measurement type, short form measurement name, and/or filter name for this measurement is: GTP.DelayDIPsaUpfUeMeanIncD1.

f) In some examples, the MOC for this measurement is: UPFFunction.

g) In some examples, potential filter values for this measurement include: N4 Session Identifier, QoS Flow Identifier, S-NSSAI, and/or 5QI.

h) One usage of this measurement is to support the end-to-end data volume transfer time analytics conducted by NWDAF.

The delay measurements in the 5G network involve several management entities and functionalities. The UPF is responsible for performing per QoS Flow per UE QoS monitoring and generating delay measurements based on requests from the SMF. The SMF initiates the QoS monitoring requests during PDU Session Establishment or Modification. A MnF acts as a MnS-P, providing services to a MnS-C, and can be located inside and/or outside the SMF and/or UPF. The MnS-C receives and processes delay measurement reports from the MnS-P. The PCF provides QoS monitoring policies included in PCC rule provisioning. The NWDAF utilizes the delay measurements for analytics related to end-to-end data volume transfer time for a determination of whether resources in the 5G network are to be modified.

Figure 7:
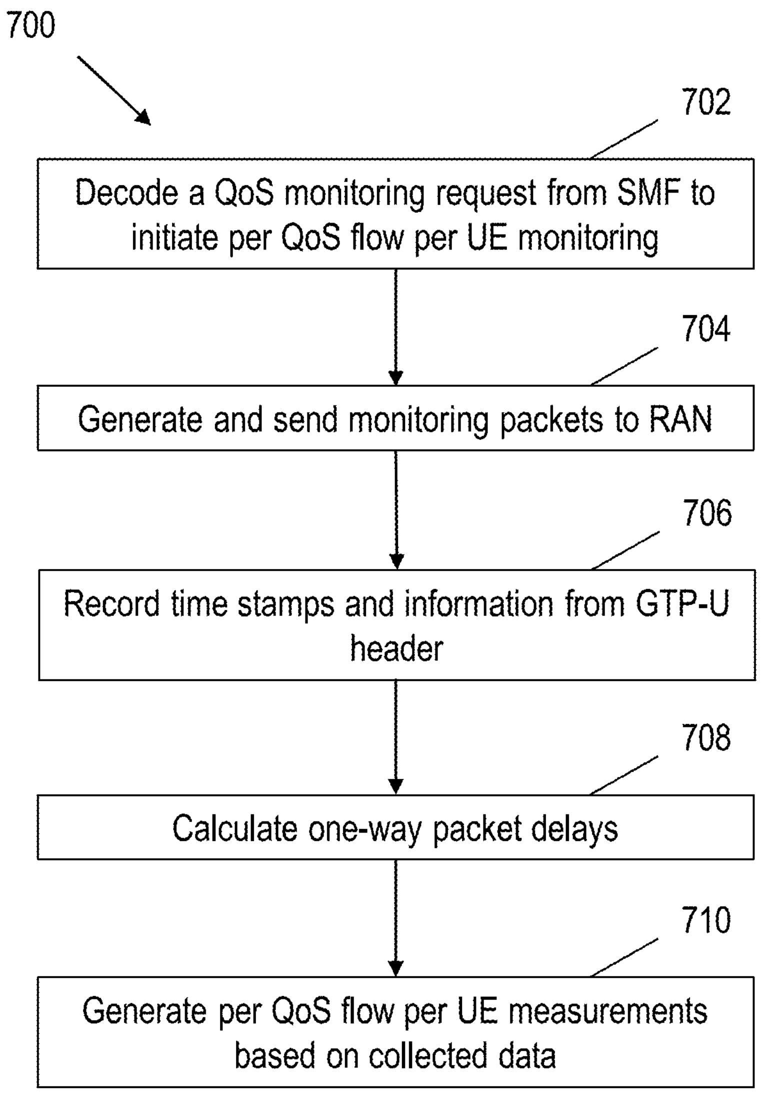
FIG. 7 illustrates a UE level measurement collection method in accordance with some embodiments.

In some embodiments, the electronic device(s), network(s), system(s), chip(s) or component(s), or portions or implementations thereof, of FIGS. 1-6 may be configured to perform one or more processes, techniques, or methods as described herein, or portions thereof. One such process is depicted in FIG. 7, which illustrates a UE level measurement collection method in accordance with some embodiments. FIG. 7 may be performed by a UPF in some embodiments. For example, the process 700 may include, at operation 702, the UPF decoding a QoS monitoring request from the SMF to initiate per QoS flow per UE monitoring. At operation 704, the UPF generates and sends monitoring packets to the RAN in response to the request. For each received GTP PDU monitoring response packet, at operation 706 the UPF records time stamps and information from the GTP-U header, specifically noting the time the packet was sent by the UPF (T1) and the time the packet was received by the RAN (T2). Using these recorded time stamps, at operation 708 the UPF calculates one-way packet delays. The one-way packet delays include the average DL and/or UL packet delays, both excluding and including D1 UL PDCP delay. At operation 710, the UPF then generates per QoS flow per UE measurements based on the collected data, which are subsequently provided to support end-to-end data volume transfer time analytics conducted by the NWDAF.

EXAMPLES

Example 1 is an apparatus for a User Plane Function (UPF), the apparatus comprising processing circuitry to: decode a Quality of Service (QOS) monitoring request from a session management function (SMF); initiate per QoS Flow per user equipment (UE) QoS monitoring based on the QoS monitoring request; generate, based on a measurement collection request, UE measurements obtained from the per QoS Flow per UE QoS monitoring; and provide, to a management system, a UE level measurement based on the UE measurements.

In Example 2, the subject matter of Example 1 includes, wherein the processing circuitry is further configured to decode the QoS monitoring request during a packet data unit (PDU) Session Establishment or PDU Session Modification procedure.

In Example 3, the subject matter of Examples 1-2 includes, wherein: the UE level measurement is an average downlink (DL) packet delay between a user plane function (UPF) and a UE for a QoS flow, and the processing circuitry is further configured to: for each DL General Packet Radio System (GPRS) Tunnelling Protocol (GTP) PDU monitoring response packet for QoS monitoring, record time stamps and information included in a GTP-U header: T1 indicating a local time the DL GTP PDU monitoring packet was sent by the UPF, T2 indicating a local time that the DL GTP PDU monitoring packet was received by a Radio Access Network (RAN), and a DL delay result from the RAN to the UE (0) indicating a DL delay measurement result, where the DL delay measurement result is a sum of a delay incurred in the RAN and a delay over a Uu interface, and count a number (N) of GTP PDU monitoring response packets for the QoS flow received in a granularity period, and determine the average DL packet delay as:

$$\frac{\sum_{i=1}^{N}(T2_i - T1_i + DRdl_i)}{N}.$$

In Example 4, the subject matter of Examples 1-3 includes, wherein: the UE level measurement is an average uplink (UL) packet delay between a user plane function (UPF) and a UE for a QoS flow excluding a D1 UL Packet Data Convergence Protocol (PDCP) delay in the UE, and the processing circuitry is further configured to: for each DL General Packet Radio System (GPRS) Tunnelling Protocol (GTP) PDU monitoring response packet for QoS monitoring, record time stamps and information: T3 received in a GTP-U header of the GTP PDU monitoring response packet, T3 indicating a local time the GTP PDU monitoring packet was sent by a Radio Access Network (RAN), T4 indicating a local time that the GTP PDU monitoring packet was received by the UPF, and a UL delay result from the UE to the RAN (DRul) indicating a UL delay measurement result, where the UL delay measurement result is a sum of a delay incurred in the RAN and a delay over a Uu interface excluding the D1 UL PDCP delay in the UE, and count a number (N) of GTP PDU monitoring response packets for the QoS flow received in a granularity period, and determine the average UL packet delay as:

$$\frac{\sum_{i=1}^{N}(T4_i - T3_i + DRul_i)}{N}.$$

In Example 5, the subject matter of Examples 1-4 includes, wherein: the UE level measurement is an average uplink (UL) packet delay between a user plane function (UPF) and a UE for a QoS flow including a D1 UL Packet Data Convergence Protocol (PDCP) delay in the UE, and the processing circuitry is further configured to: for each DL General Packet Radio System (GPRS) Tunnelling Protocol (GTP) PDU monitoring response packet for QoS monitoring, record time stamps and information: T3 received in a GTP-U header of the GTP PDU monitoring response packet, T3 indicating a local time the GTP PDU monitoring packet was sent by a Radio Access Network (RAN), T4 indicating a local time that the GTP PDU monitoring packet was received by the UPF, and a UL delay result from the UE to the RAN (DRul) indicating a UL delay measurement result, where the UL delay measurement result is a sum of a delay incurred in the RAN, a delay over a Uu interface, and the D1 UL PDCP delay in the UE, and count a number (N) of GTP PDU monitoring response packets for the QoS flow received in a granularity period, and determine the average UL packet delay as:

$$\frac{\sum_{i=1}^{N}(T4_i - T3_i + DRul_i)}{N}.$$

In Example 6, the subject matter of Examples 1-5 includes, wherein the processing circuitry is further configured to create and encode, for transmission to a Radio Access Network (RAN), monitoring packets in response to reception of the QoS monitoring request.

In Example 7, the subject matter of Examples 1-6 includes, wherein the per QoS Flow per UE QoS monitoring is initiated based on a QoS monitoring policy included in Policy and Charging Control (PCC) rule provisioning from a Policy Control Function (PCF).

In Example 8, the subject matter of Examples 1-7 includes, wherein the per QoS Flow per UE QoS monitoring is initiated based on a QFQoSMonitoringControl Managed Object Instance (MOI) from a management service producer (MnS-P).

In Example 9, the subject matter of Examples 1-8 includes, wherein the processing circuitry is further configured to decode the measurement collection request from a management function or the SMF.

In Example 10, the subject matter of Example 9 includes, wherein the management function is co-located with the SMF or a user plane function (UPF) or is located outside both the SMF and the UPF and includes a management service producer (MnS-P).

In Example 11, the subject matter of Examples 1-10 includes, Session Identifier, and QoS Flow Identifier (QFI).

Example 12 is an apparatus of a session management function (SMF), the apparatus comprising processing circuitry configured to: decode a Quality of Service (QOS) request for QoS monitoring by a User Plane Function (UPF); and in response to the QoS request, encode a QoS monitoring request for transmission to the UPF, the QoS monitoring request indicating per QoS Flow per user equipment (UE) QOS monitoring.

In Example 13, the subject matter of Example 12 includes, wherein the processing circuitry is further configured to encode the QoS monitoring request for transmission to the UPF during a packet data unit (PDU) Session Establishment or PDU Session Modification procedure.

In Example 14, the subject matter of Examples 12-13 includes, wherein the processing circuitry is further configured to encode the QoS monitoring request for transmission to the UPF based on a QoS monitoring policy included in Policy and Charging Control (PCC) rule provisioning from a Policy Control Function (PCF).

In Example 15, the subject matter of Examples 12-14 includes, wherein the processing circuitry is further configured to encode the QoS monitoring request for transmission to the UPF based on a QFQoSMonitoringControl Managed Object Instance (MOI) from a management service producer (MnS-P), and the MnS-P is in a management function located inside the SMF.

In Example 16, the subject matter of Examples 12-15 includes, wherein the processing circuitry is further configured to encode the QoS monitoring request for transmission to the UPF based on a QFQoSMonitoringControl Managed Object Instance (MOI) from a management service producer (MnS-P), and the MnS-P is in a management function located outside the SMF.

Example 17 is a non-transitory computer-readable storage medium that stores instructions for execution by one or more processors of a User Plane Function (UPF), the one or more processors to configure the UPF to, when the instructions are executed: decode a Quality of Service (QOS) monitoring request from a session management function (SMF); initiate per QoS Flow per user equipment (UE) QOS monitoring based on the QoS monitoring request; generate, based on a measurement collection request, UE measurements obtained from the per QoS Flow per UE QoS monitoring; and provide, to a management system, a UE level measurement based on the UE measurements.

In Example 18, the subject matter of Example 17 includes, wherein: the UE level measurement is an average downlink (DL) packet delay between the UPF and a UE for a QoS flow, and the instructions, when executed by the one or more processors, further configure the one or more processors to: for each DL General Packet Radio System (GPRS) Tunnelling Protocol (GTP) PDU monitoring response packet for QoS monitoring, record time stamps and information included in a GTP-U header: T1 indicating a local time the DL GTP PDU monitoring packet was sent by the UPF, T2 indicating a local time that the DL GTP PDU monitoring packet was received by a Radio Access Network (RAN), and a DL delay result from the RAN to the UE (DRdl) indicating a DL delay measurement result, where the DL delay measurement result is a sum of a delay incurred in the RAN and a delay over a Uu interface, and count a number (N) of GTP PDU monitoring response packets for the QoS flow received in a granularity period, and determine the average DL packet delay as:

$$\frac{\sum_{i=1}^{N}(T2_i - T1_i + DRdl_i)}{N}.$$

In Example 19, the subject matter of Examples 17-18 includes, wherein: the UE level measurement is an average uplink (UL) packet delay between the UPF and a UE for a QoS flow excluding a D1 UL Packet Data Convergence Protocol (PDCP) delay in the UE, and the instructions, when executed by the one or more processors, further configure the one or more processors to: for each DL General Packet Radio System (GPRS) Tunnelling Protocol (GTP) PDU monitoring response packet for QoS monitoring, record time stamps and information: T3 received in a GTP-U header of the GTP PDU monitoring response packet, T3 indicating a local time the GTP PDU monitoring packet was sent by a Radio Access Network (RAN), T4 indicating a local time that the GTP PDU monitoring packet was received by the UPF, and a UL delay result from the UE to the RAN (DRul) indicating a UL delay measurement result, where the UL delay measurement result is a sum of a delay incurred in the RAN and a delay over a Uu interface excluding the D1 UL PDCP delay in the UE, and count a number (N) of GTP PDU monitoring response packets for the QoS flow received in a granularity period, and determine the average UL packet delay as:

$$\frac{\sum_{i=1}^{N}(T4_i - T3_i + DRul_i)}{N}.$$

In Example 20, the subject matter of Examples 17-19 includes, wherein: the UE level measurement is an average uplink (UL) packet delay between the UPF and a UE for a QoS flow including a D1 UL Packet Data Convergence Protocol (PDCP) delay in the UE, and the instructions, when executed by the one or more processors, further configure the one or more processors to: for each DL General Packet Radio System (GPRS) Tunnelling Protocol (GTP) PDU monitoring response packet for QoS monitoring, record time stamps and information: T3 received in a GTP-U header of the GTP PDU monitoring response packet, T3 indicating a local time the GTP PDU monitoring packet was sent by a Radio Access Network (RAN), T4 indicating a local time that the GTP PDU monitoring packet was received by the UPF, and a UL delay result from the UE to the RAN (DRul) indicating a UL delay measurement result, where the UL delay measurement result is a sum of a delay incurred in the RAN, a delay over a Uu interface, and the D1 UL PDCP delay in the UE, and count a number (N) of GTP PDU monitoring response packets for the QoS flow received in a granularity period, and determine the average UL packet delay as:

$$\frac{\sum_{i=1}^{N}(T4_i - T3_i + DRul_i)}{N}.$$

Example 21 is at least one machine-readable medium including instructions that, when executed by processing circuitry, cause the processing circuitry to perform operations to implement of any of Examples 1-20.

Example 22 is an apparatus comprising means to implement of any of Examples 1-20.

Example 23 is a system to implement of any of Examples 1-20.

Example 24 is a method to implement of any of Examples 1-20.

Although an embodiment has been described with reference to specific example embodiments, it will be evident that various modifications and changes may be made to these embodiments without departing from the broader scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

The subject matter may be referred to herein, individually and/or collectively, by the term "embodiment" merely for convenience and without intending to voluntarily limit the scope of this application to any single concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In this document, the terms "a" or "an" are used, as is common in patent documents, to indicate one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, UE, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects. As indicated herein, although the term "a" is used herein, one or more of the associated elements may be used in different embodiments. For example, the term "a processor" configured to carry out specific operations includes both a single processor configured to carry out all of the operations as well as multiple processors individually configured to carry out some or all of the operations (which may overlap) such that the combination of processors carry out all of the operations. Further, the term "includes" may be considered to be interpreted as "includes at least" the elements that follow.

The Abstract of the Disclosure is submitted with the understanding that it will not be used to interpret or limit the scope or meaning of the claims. In addition, in the foregoing Detailed Description, it may be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, the subject matter herein lies in less than all features of a single disclosed embodiment. Thus, the following claims are hereby incorporated into the Detailed Description, with each claim standing on its own as a separate embodiment.

What is claimed is:

1. An apparatus for a User Plane Function (UPF), the apparatus comprising processing circuitry to:

decode a Quality of Service (QoS) monitoring request from a session management function (SMF);

initiate per QoS Flow per user equipment (UE) QoS monitoring based on the QoS monitoring request;

generate UE measurements obtained from the per QoS Flow per UE QoS monitoring;

provide, to a management system, a UE level measurement based on the UE measurements, the UE level measurement including an average downlink (DL) packet delay between a user plane function (UPF) and a UE for a QoS flow;

for each DL General Packet Radio System (GPRS) Tunnelling Protocol (GTP) packet data unit (PDU) monitoring response packet for QoS monitoring, record time stamps and information included in a GTP-U header:

T1 indicating a local time the DL GTP PDU monitoring packet was sent by the UPE, T2 indicating a local time that the DL GTP PDU monitoring packet was received by a Radio Access Network (RAN), and a DL delay result from the RAN to the UE (DRdl) indicating a DL delay measurement result, where the DL delay measurement result is a sum of a delay incurred in the RAN and a delay over a Uu interface;

count a number (N) of GTP PDU monitoring response packets for the QoS flow received in a granularity period, and determine the average DL packet delay as:

$$\frac{\sum_{i=1}^{N}(T2_i - T1_i + DRdl_i)}{N}.$$

2. The apparatus of claim 1, wherein the processing circuitry is further configured to decode the QoS monitoring request during a PDU Session Establishment or PDU Session Modification procedure.

3. The apparatus of claim 1, wherein:

the UE level measurement includes an average uplink (UL) packet delay between the UPF and a UE for a QoS flow excluding a D1 UL Packet Data Convergence Protocol (PDCP) delay in the UE, and the processing circuitry is further configured to:

for each DL GPRS GTP PDU monitoring response packet for QoS monitoring, record time stamps and information:

T3 received in a GTP-U header of the GTP PDU monitoring response packet, T3 indicating a local time the GTP PDU monitoring packet was sent by the RAN, T4 indicating a local time that the GTP PDU monitoring packet was received by the UPF, and a UL delay result from the UE to the RAN (DRul) indicating a UL delay measurement result, where the UL delay measurement result is a sum of a delay incurred in the RAN and a delay over a Uu interface excluding the D1 UL PDCP delay in the UE, and determine the average UL packet delay as:

$$\frac{\sum_{i=1}^{N}(T4_i - T3_i + DRul_i)}{N}.$$

4. The apparatus of claim 1, wherein:

the UE level measurement includes an average uplink (UL) packet delay between the UPF and a UE for a QoS flow excluding a D1 UL Packet Data Convergence Protocol (PDCP) delay in the UE, and the processing circuitry is further configured to:

for each DL GPRS GTP PDU monitoring response packet for QoS monitoring, record time stamps and information:

T3 received in a GTP-U header of the GTP PDU monitoring response packet, T3 indicating a local time the GTP PDU monitoring packet was sent by the RAN, T4 indicating a local time that the GTP PDU monitoring packet was received by the UPF, and a UL delay result from the UE to the RAN (DRul) indicating a UL delay measurement result, where the UL delay measurement result is a sum of a delay incurred in the RAN, a delay over a Uu interface, and the D1 UL PDCP delay in the UE, and determine the average UL packet delay as:

$$\frac{\sum_{i=1}^{N}(T4_i - T3_i + DRul_i)}{N}.$$

5. The apparatus of claim 1, wherein the processing circuitry is further configured to create and encode, for transmission to the RAN, monitoring packets in response to reception of the QoS monitoring request.

6. The apparatus of claim 1, wherein the per QoS Flow per UE QoS monitoring is initiated based on a QoS monitoring policy included in Policy and Charging Control (PCC) rule provisioning from a Policy Control Function (PCF).

7. The apparatus of claim 1, wherein the per QoS Flow per UE QoS monitoring is initiated based on a QFQoSMonitoringControl Managed Object Instance (MOI) from a management service producer (MnS-P).

8. The apparatus of claim 1, wherein the processing circuitry is further configured to decode a measurement collection request from a management function or the SMF.

9. The apparatus of claim 8, wherein the management function is co-located with the SMF or the UPF or is located outside both the SMF and the UPF and includes a management service producer (MnS-P).

10. The apparatus of claim 1, wherein the processing circuitry is further configured to record a parameter selected from a group of parameters that includes: Single Network Slice Selection Assistance Information (S-NSSAI), $5^{th}$ generation (5G) Quality of Service (QoS) Identifier (5QI), N4 Session Identifier, and QoS Flow Identifier (QFI).

11. A non-transitory computer-readable storage medium that stores instructions for execution by one or more processors of a User Plane Function (UPF), the one or more processors to configure the UPF to, when the instructions are executed:

decode a Quality of Service (QoS) monitoring request from a session management function (SMF);

initiate per QoS Flow per user equipment (UE) QoS monitoring based on the QoS monitoring request;

generate UE measurements obtained from the per QoS Flow per UE QoS monitoring;

provide, to a management system, a UE level measurement based on the UE measurements, the UE level measurement including an average downlink (DL) packet delay between a user plane function (UPF) and a UE for a QoS flow;

for each DL General Packet Radio System (GPRS) Tunnelling Protocol (GTP) packet data unit (PDU) monitoring response packet for QoS monitoring, record time stamps and information included in a GTP-U header:

T1 indicating a local time the DL GTP PDU monitoring packet was sent by the UPF, T2 indicating a local time that the DL GTP PDU monitoring packet was received by a Radio Access Network (RAN), and a DL delay result from the RAN to the UE (DRdl) indicating a DL delay measurement result, where the DL delay measurement result is a sum of a delay incurred in the RAN and a delay over a Uu interface;

count a number (N) of GTP PDU monitoring response packets for the QoS flow received in a granularity period, and determine the average DL packet delay as:

$$\frac{\sum_{i=1}^{N}(T2_i - T1_i + DRdl_i)}{N}.$$

12. The non-transitory computer-readable storage medium of claim 11, wherein:

the UE level measurement includes an average uplink (UL) packet delay between the UPF and a UE for a QoS flow excluding a D1 UL Packet Data Convergence Protocol (PDCP) delay in the UE, and the instructions, when executed by the one or more processors, further configure the one or more processors to:

for each DL GPRS (GTP) PDU monitoring response packet for QoS monitoring, record time stamps and information:

T3 received in a GTP-U header of the GTP PDU monitoring response packet, T3 indicating a local time the GTP PDU monitoring packet was sent by the RAN, T4 indicating a local time that the GTP PDU monitoring packet was received by the UPF, and a UL delay result from the UE to the RAN (DRul) indicating a UL delay measurement result, where the UL delay measurement result is a sum of a delay incurred in the RAN and a delay over a Uu interface excluding the D1 UL PDCP delay in the UE, and determine the average UL packet delay as:

$$\frac{\sum_{i=1}^{N}(T4_i - T3_i + DRul_i)}{N}.$$

13. The non-transitory computer-readable storage medium of claim 11, wherein:

the UE level measurement includes an average uplink (UL) packet delay between the UPF and a UE for a QoS flow excluding a D1 UL Packet Data Convergence Protocol (PDCP) delay in the UE, and the instructions, when executed by the one or more processors, further configure the one or more processors to:

for each DL GPRS (GTP) PDU monitoring response packet for QoS monitoring, record time stamps and information:

T3 received in a GTP-U header of the GTP PDU monitoring response packet, T3 indicating a local time the GTP PDU monitoring packet was sent by the RAN, T4 indicating a local time that the GTP PDU monitoring packet was received by the UPF, and a UL delay result from the UE to the RAN (DRul) indicating a UL delay measurement result, where the UL delay measurement result is a sum of a delay incurred in the RAN, a delay over a Uu interface, and the D1 UL PDCP delay in the UE, and determine the average UL packet delay as:

$$\frac{\sum_{i=1}^{N}(T4_i - T3_i + DRul_i)}{N}.$$

14. The non-transitory computer-readable storage medium of claim 11, wherein the per QoS Flow per UE QoS monitoring is initiated based on a QoS monitoring policy included in Policy and Charging Control (PCC) rule provisioning from a Policy Control Function (PCF).

15. The non-transitory computer-readable storage medium of claim 11, wherein the per QoS Flow per UE QoS monitoring is initiated based on a QFQoSMonitoringControl Managed Object Instance (MOI) from a management service producer (MnS-P).

16. The non-transitory computer-readable storage medium of claim 11, wherein the instructions, when executed by the one or more processors, further configure the one or more processors to decode a measurement collection request from a management function or the SMF.

17. The non-transitory computer-readable storage medium of claim 16, wherein the management function is co-located with the SMF or the UPF or is located outside both the SMF and the UPF and includes a management service producer (MnS-P).

18. The non-transitory computer-readable storage medium of claim 11, wherein the instructions, when executed by the one or more processors, further configure the one or more processors to record a parameter selected from a group of parameters that includes: Single Network Slice Selection Assistance Information (S-NSSAI), $5^{th}$ generation (5G) Quality of Service (QoS) Identifier (5QI), N4 Session Identifier, and QoS Flow Identifier (QFI).

19. The non-transitory computer-readable storage medium of claim 11, wherein the instructions, when executed by the one or more processors, further configure the one or more processors to decode the QoS monitoring request during a PDU Session Establishment or PDU Session Modification procedure.

* * * * *